(12) United States Patent
Hirmer et al.

(10) Patent No.: US 10,803,135 B2
(45) Date of Patent: Oct. 13, 2020

(54) TECHNIQUES FOR DISAMBIGUATING CLUSTERED OCCURRENCE IDENTIFIERS

(71) Applicant: Apple Inc., Cupertino, CA (US)

(72) Inventors: Benedikt M. Hirmer, San Francisco, CA (US); Kevin Bessiere, Santa Clara, CA (US); Eric Circlaeys, Los Gatos, CA (US); Shanni A. Weilert, San Jose, CA (US); Christopher C. Foster, San Jose, CA (US); Krishna M. Behara, Santa Clara, CA (US); Kartheekeya D. Kasibatta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 16/219,661

(22) Filed: Dec. 13, 2018

(65) Prior Publication Data

US 2020/0081931 A1 Mar. 12, 2020

Related U.S. Application Data

(60) Provisional application No. 62/729,621, filed on Sep. 11, 2018.

(51) Int. Cl.
*G06F 16/30* (2019.01)
*G06F 16/9537* (2019.01)
(Continued)

(52) U.S. Cl.
CPC ........ *G06F 16/9537* (2019.01); *G06F 16/906* (2019.01); *G06F 16/907* (2019.01); *G06F 16/9035* (2019.01)

(58) Field of Classification Search
CPC .... G06F 16/95; G06F 16/9537; G06F 16/906; G06F 16/907
(Continued)

(56) References Cited

U.S. PATENT DOCUMENTS 5,416,895 A 5/1995 Anderson et al.
5,565,888 A 10/1996 Selker
(Continued)

FOREIGN PATENT DOCUMENTS

CN 1717918 A 1/2006
CN 1756273 A 4/2006
(Continued)

OTHER PUBLICATIONS

US 2002/0018582 A1, 02/2002, Hagiwara (withdrawn)
(Continued)

*Primary Examiner* — Sana A Al-Hashemi
(74) *Attorney, Agent, or Firm* — Blank Rome LLP

(57) ABSTRACT

Embodiments of the present disclosure present devices, methods, and computer readable medium for disambiguating clustered occurrence identifiers. Digital assets contain a plurality of metadata that can be used to identify the occurrence or event during which the digital asset was captured. Techniques can use various types contextual information based on a category of the digital asset for disambiguation. Events can occur at various locations, over a dispersed area and it can be challenging to automatically identify and label the digital assets with the identification of the event. Automatically labelling the digital assets assists user in organizing and sharing the digital assets with friends and family. Users can search for events by event name, performer name, and category.

20 Claims, 19 Drawing Sheets

(51) Int. Cl.
  *G06F 16/907* (2019.01)
  *G06F 16/9035* (2019.01)
  *G06F 16/906* (2019.01)

(58) Field of Classification Search
  USPC ....... 707/607, 609, 687, 705, 769, 790, 813, 707/821
  See application file for complete search history.

(56) References Cited

U.S. PATENT DOCUMENTS

| | | |
|---|---|---|
| 5,604,861 A | 2/1997 | Douglas et al. |
| 5,677,708 A | 10/1997 | Matthews, III et al. |
| 5,757,368 A | 5/1998 | Gerpheide et al. |
| 5,784,061 A | 7/1998 | Moran et al. |
| 5,825,349 A | 10/1998 | Meier et al. |
| 5,956,035 A | 9/1999 | Sciammarella et al. |
| 5,973,694 A | 10/1999 | Steele et al. |
| 6,073,036 A | 6/2000 | Heikkinen et al. |
| 6,237,010 B1 | 5/2001 | Hui et al. |
| 6,252,596 B1 | 6/2001 | Garland |
| 6,279,018 B1 | 8/2001 | Kudrolli et al. |
| 6,301,586 B1 | 10/2001 | Yang et al. |
| 6,334,025 B1 | 12/2001 | Yamagami |
| 6,351,556 B1 | 2/2002 | Loui et al. |
| 6,441,824 B2 | 8/2002 | Hertzfeld |
| 6,452,597 B1 | 9/2002 | Goldberg et al. |
| 6,477,117 B1 | 11/2002 | Narayanaswami et al. |
| 6,606,411 B1 | 8/2003 | Loui et al. |
| 6,686,938 B1 | 2/2004 | Jobs et al. |
| 6,741,268 B1 | 5/2004 | Hayakawa |
| 6,784,925 B1 | 8/2004 | Tomat et al. |
| 6,915,011 B2 | 7/2005 | Loui et al. |
| 6,920,619 B1 | 7/2005 | Milekic |
| 7,015,910 B2 | 3/2006 | Card et al. |
| 7,139,982 B2 | 11/2006 | Card et al. |
| 7,164,410 B2 | 1/2007 | Kupa |
| 7,178,111 B2 | 2/2007 | Glein et al. |
| 7,325,198 B2 | 1/2008 | Adcock et al. |
| 7,421,449 B2 | 9/2008 | Williams et al. |
| 7,434,177 B1 | 10/2008 | Ording et al. |
| 7,587,671 B2 | 9/2009 | Saft et al. |
| 7,627,828 B1 | 12/2009 | Collision et al. |
| 7,636,733 B1 | 12/2009 | Rothmuller |
| 7,680,340 B2 | 3/2010 | Lou et al. |
| 7,716,194 B2 | 5/2010 | Williams et al. |
| 7,747,625 B2 | 6/2010 | Gargi et al. |
| 7,788,592 B2 | 8/2010 | Williams et al. |
| 7,823,080 B2 | 10/2010 | Miyajima et al. |
| 7,831,100 B2 | 11/2010 | Gallagher |
| 7,843,454 B1 | 11/2010 | Biswas |
| 7,865,215 B2 | 1/2011 | Bells et al. |
| 7,991,234 B2 | 8/2011 | Hamasaki et al. |
| 8,024,658 B1 | 9/2011 | Fagans et al. |
| 8,028,249 B2 | 9/2011 | Loui et al. |
| 8,106,856 B2 | 1/2012 | Matas et al. |
| RE43,260 E | 3/2012 | Paalasmaa et al. |
| 8,200,669 B1 | 6/2012 | Iampietro et al. |
| 8,305,355 B2 | 11/2012 | Matas et al. |
| 8,339,420 B2 | 12/2012 | Hiraoka |
| 8,352,471 B2 | 1/2013 | Oami |
| 8,406,473 B2 | 3/2013 | Tanaka |
| 8,571,331 B2 | 10/2013 | Cifarelli |
| 8,698,762 B2 | 4/2014 | Wagner et al. |
| 9,042,646 B2 | 5/2015 | Das et al. |
| 9,123,086 B1 | 9/2015 | Freeland et al. |
| 9,143,601 B2 | 9/2015 | Padmanabbban et al. |
| 9,411,506 B1 | 8/2016 | Prado et al. |
| 2002/0021758 A1 | 2/2002 | Chui |
| 2002/0054233 A1 | 5/2002 | Juen |
| 2002/0093531 A1 | 7/2002 | Barile |
| 2002/0168108 A1 | 11/2002 | Loui |
| 2003/0033296 A1 | 2/2003 | Rothmuller et al. |
| 2003/0048291 A1 | 3/2003 | Dieberger |
| 2003/0090504 A1 | 5/2003 | Brook |
| 2003/0122787 A1 | 7/2003 | Zimmerman |
| 2004/0046886 A1 | 3/2004 | Ambiru |
| 2004/0119758 A1 | 6/2004 | Grossman |
| 2004/0125150 A1 | 7/2004 | Adcock et al. |
| 2004/0143590 A1 | 7/2004 | Wong |
| 2004/0167898 A1 | 8/2004 | Margolus |
| 2004/0205504 A1 | 10/2004 | Phillips |
| 2004/0207722 A1 | 10/2004 | Koyama |
| 2004/0212617 A1 | 10/2004 | Fitzmaurice |
| 2005/0020317 A1 | 1/2005 | Koyama |
| 2005/0041035 A1 | 2/2005 | Nagatomo |
| 2005/0044066 A1 | 2/2005 | Hooper et al. |
| 2005/0052427 A1 | 3/2005 | Wu |
| 2005/0062130 A1 | 3/2005 | Ciancio |
| 2005/0071736 A1 | 3/2005 | Schneider |
| 2005/0071767 A1 | 3/2005 | Kirkland |
| 2005/0073601 A1 | 4/2005 | Battles |
| 2005/0076056 A1 | 4/2005 | Paalasmaa |
| 2005/0102635 A1 | 5/2005 | Jiang |
| 2005/0104848 A1 | 5/2005 | Yamaguchi |
| 2005/0128305 A1 | 6/2005 | Hamsaki et al. |
| 2005/0134945 A1 | 6/2005 | Gallagher |
| 2005/0160377 A1 | 7/2005 | Sciammarella |
| 2005/0183026 A1 | 8/2005 | Amano |
| 2005/0195221 A1 | 9/2005 | Berger |
| 2005/0275636 A1 | 12/2005 | Dehlin |
| 2006/0001652 A1 | 1/2006 | Chiu |
| 2006/0017692 A1 | 1/2006 | Wehrenberg et al. |
| 2006/0025218 A1 | 2/2006 | Hotta |
| 2006/0026521 A1 | 2/2006 | Hotelling et al. |
| 2006/0026536 A1 | 2/2006 | Hotelling et al. |
| 2006/0036960 A1 | 2/2006 | Loui et al. |
| 2006/0072028 A1 | 4/2006 | Hong |
| 2006/0077266 A1 | 4/2006 | Numi |
| 2006/0080386 A1 | 4/2006 | Roykkee |
| 2006/0088228 A1 | 4/2006 | Marriott et al. |
| 2006/0090141 A1 | 4/2006 | Loui et al. |
| 2006/0136839 A1 | 6/2006 | Makela |
| 2006/0155757 A1 | 7/2006 | Williams et al. |
| 2006/0156237 A1 | 7/2006 | Williams et al. |
| 2006/0156245 A1 | 7/2006 | Williams et al. |
| 2006/0156246 A1 | 7/2006 | Williams et al. |
| 2006/0265643 A1 | 11/2006 | Saft et al. |
| 2007/0008321 A1 | 1/2007 | Gallagher et al. |
| 2007/0016868 A1 | 1/2007 | Nurmi |
| 2007/0081740 A1 | 4/2007 | Ciudad et al. |
| 2007/0115373 A1 | 5/2007 | Gallagher et al. |
| 2007/0136778 A1 | 6/2007 | Birger |
| 2007/0152984 A1 | 7/2007 | Ording |
| 2007/0204225 A1 | 8/2007 | Berkowitz |
| 2007/0229678 A1 | 10/2007 | Barrus |
| 2007/0245236 A1 | 10/2007 | Lee |
| 2008/0030456 A1 | 2/2008 | Asadi |
| 2008/0057941 A1 | 3/2008 | Scott et al. |
| 2008/0059888 A1 | 3/2008 | Dunko |
| 2008/0062141 A1 | 3/2008 | Chandhri |
| 2008/0091637 A1 | 4/2008 | Escamilla |
| 2008/0133697 A1 | 6/2008 | Stewart |
| 2008/0152201 A1 | 6/2008 | Zhang et al. |
| 2008/0165081 A1* | 7/2008 | Lawther ................ G06F 3/1446 345/1.2 |
| 2008/0168349 A1 | 7/2008 | Lamiraux et al. |
| 2008/0168402 A1 | 7/2008 | Blumenberg |
| 2008/0256577 A1 | 10/2008 | Funaki et al. |
| 2008/0282202 A1 | 11/2008 | Sunday |
| 2008/0309632 A1 | 12/2008 | Westerman et al. |
| 2009/0006965 A1 | 1/2009 | Bodin et al. |
| 2009/0021576 A1 | 1/2009 | Linder et al. |
| 2009/0063542 A1 | 3/2009 | Bull et al. |
| 2009/0113350 A1 | 4/2009 | Hibino et al. |
| 2009/0132921 A1 | 5/2009 | Hwangbo et al. |
| 2009/0161962 A1 | 6/2009 | Gallagher et al. |
| 2009/0210793 A1 | 8/2009 | Yee et al. |
| 2009/0216806 A1 | 8/2009 | Feuerstein et al. |
| 2009/0278806 A1 | 11/2009 | Duarte et al. |
| 2009/0282371 A1 | 11/2009 | Curl |
| 2009/0287470 A1 | 11/2009 | Farnsworth et al. |
| 2009/0300146 A1 | 12/2009 | Park et al. |
| 2009/0307623 A1 | 12/2009 | Agarawala et al. |

(56) References Cited

U.S. PATENT DOCUMENTS

| | | |
|---|---|---|
| 2009/0319472 A1 | 12/2009 | Jain et al. |
| 2009/0325701 A1 | 12/2009 | Andres Del Valle |
| 2010/0045828 A1 | 2/2010 | Gallagher |
| 2010/0076976 A1 | 3/2010 | Sotirov et al. |
| 2010/0083173 A1 | 4/2010 | Germann et al. |
| 2010/0103321 A1 | 4/2010 | Ishikawa et al. |
| 2010/0110228 A1 | 5/2010 | Ozawa et al. |
| 2010/0114891 A1 | 5/2010 | Oami |
| 2010/0125786 A1 | 5/2010 | Ozawa et al. |
| 2010/0150456 A1 | 6/2010 | Tanaka |
| 2010/0207892 A1 | 8/2010 | Lin et al. |
| 2010/0287053 A1 | 11/2010 | Ganong et al. |
| 2010/0302179 A1 | 12/2010 | Ahn et al. |
| 2011/0025719 A1 | 2/2011 | Yanase |
| 2011/0035700 A1 | 2/2011 | Meaney et al. |
| 2011/0050564 A1 | 3/2011 | Alberth et al. |
| 2011/0050640 A1 | 3/2011 | Lundback et al. |
| 2011/0099199 A1 | 4/2011 | Stalenhoef et al. |
| 2011/0099478 A1 | 4/2011 | Gallagher et al. |
| 2011/0126148 A1 | 5/2011 | Krishnaraj et al. |
| 2011/0145275 A1 | 6/2011 | Stewart |
| 2011/0145327 A1 | 6/2011 | Stewart |
| 2011/0191661 A1 | 8/2011 | Phillips et al. |
| 2011/0246463 A1 | 10/2011 | Carson, Jr. et al. |
| 2011/0267368 A1 | 11/2011 | Casillas et al. |
| 2011/0282867 A1 | 11/2011 | Palermiti, II et al. |
| 2011/0292230 A1* | 12/2011 | Winters ............ H04N 1/00244 348/222.1 |
| 2011/0292231 A1* | 12/2011 | Winters ............ H04N 1/00323 348/222.1 |
| 2011/0320938 A1 | 12/2011 | Schorsch |
| 2012/0110438 A1 | 5/2012 | Peraza et al. |
| 2012/0243735 A1 | 9/2012 | Wu |
| 2013/0022282 A1 | 1/2013 | Cooper |
| 2013/0040660 A1 | 2/2013 | Fisher et al. |
| 2013/0061175 A1 | 3/2013 | Matas et al. |
| 2013/0156275 A1 | 6/2013 | Amacker et al. |
| 2013/0198176 A1 | 8/2013 | Kim |
| 2014/0046914 A1 | 2/2014 | Das et al. |
| 2014/0055495 A1 | 2/2014 | Kim et al. |
| 2014/0064572 A1 | 3/2014 | Panzer et al. |
| 2014/0082533 A1 | 3/2014 | Kelley |
| 2014/0089330 A1 | 3/2014 | Cui et al. |
| 2014/0143693 A1 | 5/2014 | Goossens et al. |
| 2014/0157321 A1 | 6/2014 | Kurita |
| 2014/0181089 A1 | 6/2014 | Desmond et al. |
| 2014/0189584 A1 | 7/2014 | Weng et al. |
| 2014/0198234 A1 | 7/2014 | Kobayashi et al. |
| 2014/0218371 A1 | 8/2014 | Du et al. |
| 2014/0222809 A1 | 8/2014 | Hochmuth et al. |
| 2014/0236882 A1 | 8/2014 | Rishe |
| 2014/0250126 A1 | 9/2014 | Baldwin et al. |
| 2014/0250374 A1 | 9/2014 | Ohki et al. |
| 2014/0282011 A1 | 9/2014 | Dellinger et al. |
| 2014/0289222 A1 | 9/2014 | Sharpe et al. |
| 2014/0304262 A1* | 10/2014 | Makki .................. G06F 16/95 707/736 |
| 2014/0337324 A1 | 11/2014 | Chao et al. |
| 2014/0341476 A1 | 11/2014 | Kulick et al. |
| 2014/0351720 A1 | 11/2014 | Yin |
| 2015/0005013 A1 | 1/2015 | Cao et al. |
| 2015/0078680 A1 | 3/2015 | Shakib et al. |
| 2015/0082250 A1 | 3/2015 | Wagner et al. |
| 2015/0091896 A1 | 4/2015 | Tarquini et al. |
| 2015/0106752 A1 | 4/2015 | Yang |
| 2015/0130719 A1 | 5/2015 | Wehrenberg et al. |
| 2015/0143234 A1 | 5/2015 | Norris, III |
| 2015/0213604 A1 | 7/2015 | Li et al. |
| 2015/0227611 A1 | 8/2015 | Bao et al. |
| 2015/0287162 A1 | 10/2015 | Canan et al. |
| 2015/0363409 A1 | 12/2015 | Wood et al. |
| 2016/0019388 A1 | 1/2016 | Singla et al. |
| 2016/0140146 A1 | 5/2016 | Wexler et al. |
| 2016/0358311 A1 | 12/2016 | Chen et al. |
| 2017/0019587 A1 | 1/2017 | Matas et al. |
| 2017/0244959 A1 | 8/2017 | Ranjeet et al. |
| 2017/0357409 A1 | 12/2017 | Wagner et al. |
| 2018/0091732 A1 | 3/2018 | Wilson et al. |

FOREIGN PATENT DOCUMENTS

| | | |
|---|---|---|
| CN | 101196786 A | 6/2008 |
| CN | 101291409 A | 10/2008 |
| EP | 1124175 A2 | 8/2001 |
| EP | 1289210 A2 | 3/2003 |
| FR | 2830093 A3 | 3/2003 |
| GB | 2420260 A | 5/2006 |
| JP | H03217976 A | 9/1991 |
| JP | H06309138 A | 11/1994 |
| JP | H11164175 A | 6/1999 |
| JP | H11168694 A | 6/1999 |
| JP | 2000112997 A | 4/2000 |
| JP | 2000138883 A | 5/2000 |
| JP | 2000148591 A | 5/2000 |
| JP | 2000221879 A | 8/2000 |
| JP | 2000244673 A | 9/2000 |
| JP | 2000350134 A | 12/2000 |
| JP | 2001136303 A | 5/2001 |
| JP | 2001265481 A | 9/2001 |
| JP | 2001309019 A | 11/2001 |
| JP | 2003338975 A | 11/2003 |
| JP | 2004032346 A | 1/2004 |
| JP | 2004145291 A | 5/2004 |
| JP | 2004153832 A | 5/2004 |
| JP | 2004288208 A | 10/2004 |
| JP | 2004336536 A | 11/2004 |
| JP | 2004336711 A | 11/2004 |
| JP | 2005038101 A | 2/2005 |
| JP | 2005092386 A | 4/2005 |
| JP | 2005100084 A | 4/2005 |
| JP | 2005515530 A | 5/2005 |
| JP | 2005150836 A | 6/2005 |
| JP | 2005175991 A | 6/2005 |
| JP | 2005182320 A | 7/2005 |
| JP | 2005202483 A | 7/2005 |
| JP | 2005202651 A | 7/2005 |
| JP | 2005303728 A | 10/2005 |
| JP | 2005321516 A | 11/2005 |
| JP | 2005339420 A | 12/2005 |
| JP | 2006067344 A | 3/2006 |
| JP | 2006139340 A | 6/2006 |
| JP | 2006140865 A | 6/2006 |
| JP | 2006195592 A | 7/2006 |
| JP | 2006236249 A | 9/2006 |
| JP | 2007515775 A | 6/2007 |
| JP | 2007525775 A | 9/2007 |
| JP | 2008059614 A | 3/2008 |
| JP | 2008106469 A | 5/2008 |
| JP | 2008236794 A | 10/2008 |
| JP | 2013140171 A | 7/2013 |
| KR | 20050101162 A | 10/2005 |
| KR | 20060032793 A | 4/2006 |
| WO | 2003023593 A1 | 3/2003 |
| WO | 2003081458 A1 | 10/2003 |
| WO | 2005093550 A2 | 10/2005 |
| WO | 2005103863 A2 | 11/2005 |
| WO | 2008030779 A2 | 3/2008 |
| WO | 2009082814 A1 | 7/2009 |
| WO | 2009150425 | 12/2009 |
| WO | 2009155991 A1 | 12/2009 |
| WO | 2010059188 A2 | 5/2010 |

OTHER PUBLICATIONS

Cyr, Jim, "Apple Watch—Customize Modular Watch Face", May 13, 2015, Retrieved from the Internet URL: https://www.youtube.com/watch?v=02W93HbKIK8 [Retrieved on Sep. 16, 2012], 2 pages.

Geek, "How to Put the Day of the Week into the Windows Taskbar Clock", 2014, Retrieved from the Internet: URL: https://www.howtogeek.com/194103/how-to-put-the-day-of-the-week-into-the-window-task-bar-clock/ [Retrieved on Mar. 10, 2017], 3 pages.

(56) References Cited

OTHER PUBLICATIONS

Karlson et al., "AppLens and Launch Tile: Two Designs for One-Handed Thumb Use on Small Devices," CHI 2005, Papers: Small Devices 1, Apr. 2-7, 2005, pp. 201-201.

Liao T. Warren, "Clustering of time series data—a survey," Pattern Recognition, Elsevier, GB, vol. 38, No. 11, Nov. 1, 2005 (Nov. 1, 2005), pp. 1857-1874, XP027610890, ISSN: 0031-3203 [retrieved Nov. 1, 2005].

Mozilla Developer Network, "Mouse Gesture Events," May 14, 2009, Retrieved from the Internet: URL: https://developer.mozilla.org/en~US/docs/Web/Guide/Events/Mouse_gesture_events [Retrieved on May 17, 2011], 3 pages.

Van Wijk Hark J., et al., "Cluster and Calendar based Visualization of Time Series Data," Information Visualization, 1999, (info vis '99), Proceedings, 1999 IEEE Symposium on San Francisco, CA USA Oct. 24-29, 1999, Los Alamitos, CA USA, IEEE Comput. Soc., US, Oct. 24, 1999 (Oct. 24, 1999), pp. 4-9, 140 XP101356933, DOI: 10.1109/INVIS.1999.801851 ISBN:978-0-7695-0431-5.

Gallagher et al., Image Annotation Using Personal Colanders as Context, AMC Intl. Conf. on Multimedia 2008.

International Search Report and Written Opinion received in corresponding PCT Application No. PCT/US2011/048169, dated Oct. 21, 2011.

\* cited by examiner

TECHNIQUES FOR DISAMBIGUATING CLUSTERED OCCURRENCE IDENTIFIERS

CROSS-REFERENCES TO RELATED APPLICATIONS

This application claims the benefit of U.S. Provisional Application No. 62/729,621, entitled "Techniques for Disambiguating Clustered Occurrence Identifiers," filed Sep. 11, 2018. This application incorporates by reference commonly-owned U.S. Patent Application Ser. No. 62/668,153, filed May 7, 2018, entitled "Digital Asset Search Techniques," in its entirety and for all purposes. This application also incorporates by reference commonly-owned U.S. patent application Ser. No. 15/391,276, filed Dec. 27, 2016, entitled "Knowledge Graph Metadata Network Based on Notable Moments," U.S. Provisional Application No. 62/729,619, entitled "Techniques for Disambiguating Clustered Location Identifiers," filed Sep. 11, 2018, and U.S. patent application Ser. No. 16/219,602, filed concurrently herewith, entitled "Techniques For Disambiguating Clustered Location Identifiers" in its entirety and for all purposes.

BACKGROUND

Modern computing devices provide the opportunity to capture and store thousands of photos, videos, and other digital assets in the device. It can be challenging to find specific photos or videos to share with friends and family. Manually labeling these thousands of digital assets can be arduous and time consuming and may make it difficult to link a single digital asset with multiple collections. A user may have to sort through many irrelevant digital assets prior to finding one of interest. Digital assets can be captured at events (e.g., sporting events, music festivals, concerts, etc.) especially at non-traditional venues. While GPS can have a precision down to +/−10 meters, the location metadata for digital assets may only have a precision of +/−200 meters which may not be precise enough to disambiguate the location where the digital asset was captured. Some events such as concerts occur over a large dispersed area and it can be difficult to precisely determine where a digital asset was captured. Further, users frequently associate digital assets that are captured within a close vicinity or shortly before or after visiting an event with the event. Without use of the techniques described herein these digital assets may not be associated with the event.

SUMMARY

Embodiments of the present disclosure can provide devices, methods, and computer-readable medium for disambiguating clustered location identifiers. The present disclosure ingests digital assets and associated metadata into a memory of a computing device. The techniques disclosed herein identify the clusters of digital assets in the digital asset collection and utilized captured metadata and other information to automatically identify a capture location identifier from a plurality of event identifiers. The digital assets in the cluster can be tagged with this information. Once the digital assets are tagged with the event information, a user can easily perform a search for the location and recall one of more digital assets from a search. These techniques enable a user to quickly and easily filter digital assets in a digital asset collection. The disclosed techniques allow for rapid recall of desired assets, linking assets into logical collections, and providing an overall improved user experience.

In various embodiments, the difficulties in disambiguating clustered occurrence identifiers can be overcome through the techniques described in the present disclosure. In various embodiments, the techniques can be performed by one or more processors of a computing device. The techniques can involve identifying a collection of digital assets having at least a first digital asset and a second digital asset, the collection of digital assets being stored on a computing device. In various embodiments, the techniques can include generating a consolidated address for a location cluster of digital assets comprising the first digital asset and the second digital asset. In various embodiments, a first geographic location for the consolidated address can be determined based at least in part on location metadata associated with the first digital asset. Additionally, a first time for the first digital asset can be determined based at least in part on time metadata associated with the first digital asset.

In various embodiments, the techniques can include transmitting a request to a web service for a plurality of event identifiers within a target range of the first geographic location. According to various embodiments, each of the event identifiers specify an event geographic location and an event time. The technique includes filtering the plurality of event identifiers where the filtering removes the plurality of event identifiers locations visited above a frequency threshold. Next, the techniques include accessing a knowledge graph stored on the computing device to correlate metadata for the collection of digital assets with a category identified in the knowledge graph. Next, the technique includes calculating a distance range between the first geographic location and a second geographic location, where the second geographic location based at least in part on location metadata associated with the second digital asset, the second digital asset being within a target range of the event geographic location.

In various embodiments, the techniques can include calculating a time range between the first time and a second time, the second time based at least in part on time metadata associated with the second digital asset. Next, the technique includes calculating a confidence metric, where the confidence metric indicating a degree of confidence that the first digital asset was generated at an event corresponding to at least one of the plurality of event identifiers. The confidence metric can be calculated based at least in part on rules for the category of the first digital asset. According to various embodiments, the rules specify that the distance range that satisfies a minimum distance, the time range that satisfies a minimum duration, and a number of digital assets stored on the computing device that are within the distance range of the event geographic location and within the time range of an event time that satisfies a minimum number. Next, the first digital asset can be associated with at least one of the plurality of event identifiers based at least in part on a determination that the confidence metric exceeds a threshold; and updating the knowledge graph stored in the computing device to include the association between the first digital asset and the at least one of the plurality event identifiers.

In various embodiments, the techniques can include increasing the minimum distance to include additional digital assets captured within an expanded distance of the event geographic location.

In various embodiments, the techniques can include expanding the event time to include additional digital assets captured prior to or after the event In various embodiments, the techniques can include accessing the knowledge graph for a determination that scene metadata for the first digital asset identifies the category for the first digital asset based at least in part on image analysis of objects in the first digital asset. In some embodiments, the other knowledge graph entries can include part of the day (morning, noon, afternoon, evening, night). In some embodiments, the time of day represents the distribution of digital assets per asset cluster.

In various embodiments, the techniques can include transmitting a request, to a second location service, the second location service tracking a history of geographic locations for the computing device over time, the request to the second location service requesting a length of time the computing device was located within a specified distance from the plurality of event identifiers within the target range of the first geographic location. The techniques can further include modifying the confidence metric based at least in part on the length of time the computing device spent within the specified distance from the plurality of event identifiers within the target range of the first geographic location.

In various embodiments, the techniques can include associating the second digital asset with the at least one of the plurality of event identifiers based on a determination that the confidence metric exceeds a threshold. The techniques can include updating the knowledge graph stored in the computing device to include the association between the second digital asset and the at least one of the plurality of event identifiers.

In various embodiments, the techniques can include linking the first digital asset associated with one of the plurality of event identifiers at least one of a name, a performer, and a venue for the event.

In various embodiments, the techniques can include linking the first digital asset associated with one of the plurality of event identifiers with an event category for the event.

In various embodiments, each of the features described above for disambiguating clustered occurrence identifiers can be stored as a plurality of instructions in a computer readable medium.

In various embodiments, each of the features described above for disambiguating clustered occurrence identifiers can be incorporated in a computing device, including one or more memories, and one or more processors in communication with the one or more memories and configured to execute instructions stored in the one or more memories.

The following detailed description together with the accompanying drawings will provide a better understanding of the nature and advantages of the present disclosure.

DETAILED DESCRIPTION

Figure 1:
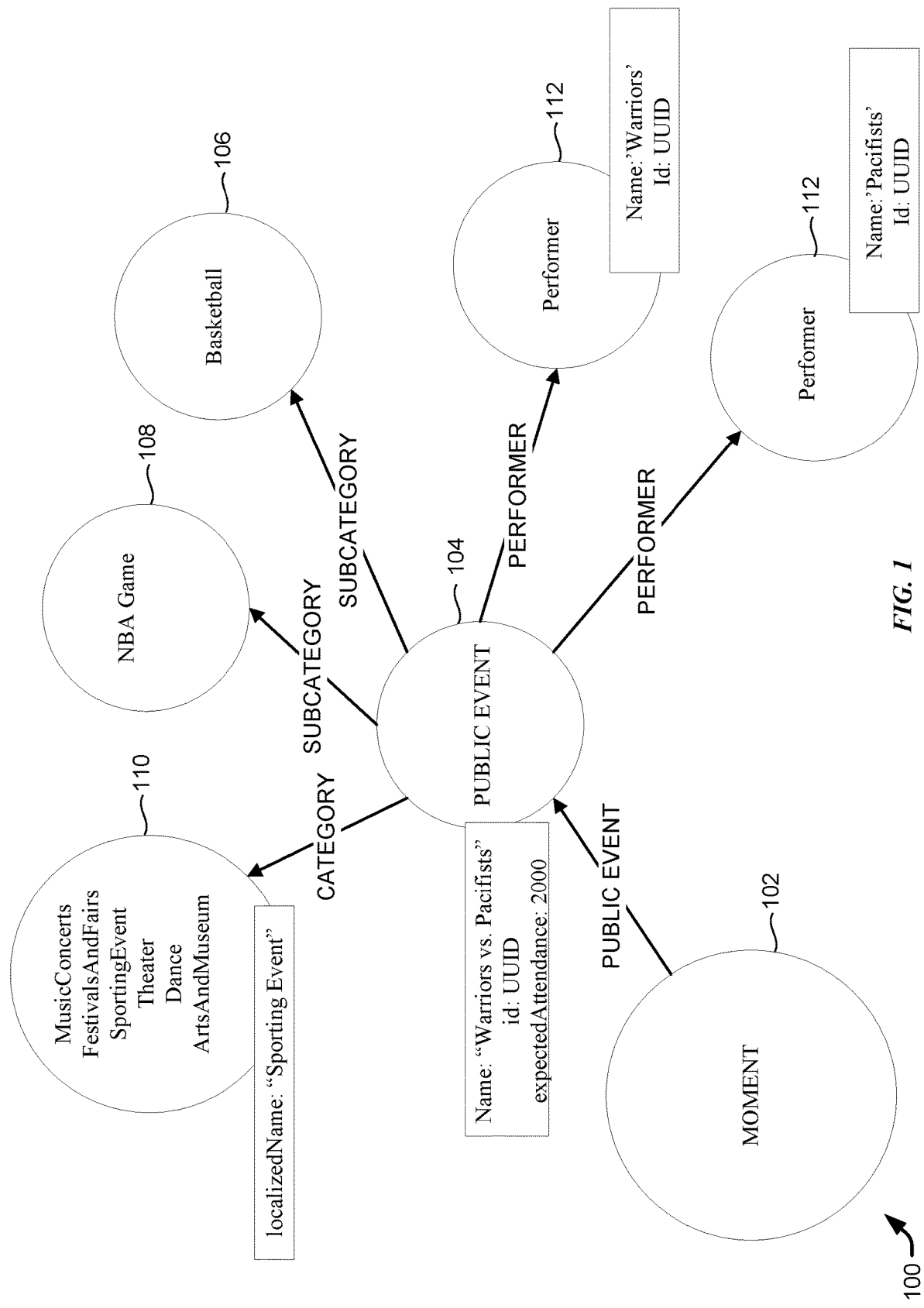
FIG. 1 illustrates an exemplary schema for disambiguation of clustered occurrence identifiers.

Certain embodiments of the present disclosure relate to devices, computer-readable medium, and methods for implementing various techniques for disambiguating clustered occurrence identifiers in a computing device. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The present disclosure describes devices and methods for disambiguating clustered occurrence identifiers in a computing device for various digital assets (e.g., digital photos, digital video, etc.) stored in a digital asset collection on computing device.

Embodiments of the present disclosure are directed to, among other things, improving a user experience concerning the accessing and searching of a digital asset collection. As used herein, a "digital asset" may include data that can be stored in or as a digital form (e.g., digital image, digital video, music files, digital voice recording). As used herein, a "digital asset collection" refers to multiple digital assets that may be stored in one or more storage locations. The one or more storage locations may be spatially or logically separated. As used herein, a "knowledge graph" refers to a metadata network associated with a collection of digital assets including correlated metadata assets describing characteristics associated with digital assets in the digital asset collection. As used herein, a "node" in a metadata network refers to a metadata asset associated with one or more digital assets in a digital asset collection. As used herein, a "consolidated address" is a construct built on top of address edges and node in the knowledge graph. A consolidated address combines several address edges that point to the same place mark with a maximum time and distance location. Using consolidated address helps extend attendance time for users visiting large venues. The examples and contexts of such examples provided herein are intended for illustrative purposes and not to limit the scope of this disclosure.

In some embodiments, the digital asset management module/logic can enable the system to generate and use and knowledge graph of the digital asset metadata as a multidimensional network. The digital asset management module/logic can obtain or receive a collection of digital asset metadata associated with the digital asset collection. The digital assets stored in the digital asset collection includes, but is not limited to, the following: image media (e.g., still or animated image, etc.); audio media (e.g., a digital sound file); text media (e.g., an e-book, etc.); video media (e.g., a movie, etc.); and haptic media (e.g., vibrations or motions provided in connection with other media, etc.). The examples of digitized data above can be combined to form multimedia (e.g., an animated movie, a videogame etc.). A single digital asset refers to a single instance of digitized data (e.g., an image, a song, a movie, etc.).

As used herein, "metadata" and "digital asset metadata" collectively referred to information about one or more digital assets. Metadata can be: (i) a single instance of information about digitized data (e.g., a timestamp associated with one or more images, etc.); or (ii) a grouping of metadata, which refers to a group comprised of multiple instances of information about digitized data (e.g., several timestamps associated with one or more images etc.). There are different types of metadata. Each type of metadata describes one or more characteristics or attributes associated with one or more digital assets. Each metadata type can be categorized as primitive metadata or inferred metadata, as described further below.

In some embodiments, the digital asset management module/logic can identify primitive metadata associated with one or more digital assets within the digital asset metadata. In some embodiments, the digital asset management module/logic may determine inferred metadata based on at least on the primitive metadata. As used herein, "primitive metadata" refers to metadata that describes one or more characteristics or attributes associated with one or more digital assets. That is, primitive metadata includes acquired metadata describing one or more digital assets. In some cases, primitive metadata can be extracted from inferred metadata, as described further below.

Primary primitive metadata can include one or more of: time metadata, Geo-position metadata; geolocation metadata; people metadata; scene metadata; content metadata; object metadata; and sound metadata. Time metadata refers to a time associated with one or more digital assets (e.g., a timestamp associated with the digital asset, a time the digital asset is generated, a time the digital asset is modified, a time the digital asset is stored, a time the digital asset is transmitted, a time the digital asset is received, etc.). Geo-position metadata refers to geographic or spatial attributes associated with one or more digital assets using a geographic coordinate system (e.g., latitude, longitude, and/or altitude, etc.). Geolocation metadata refers to one or more meaningful locations associated with one or more digital assets rather than geographic coordinates associated with digital assets. Examples include a beach (and its name), a street address, a country name, a region, a building, a landmark, etc. Geolocation metadata can, for example, be determined by processing geographic position information together with data from a map application to determine that the geolocation for a scene in a group of images. People metadata refers to at least one detected or known person associated with one or more digital assets (e.g., a known person in an image detected through facial recognition techniques, etc.). Scene metadata refers to an overall description of an activity or situation associated with one or more digital assets. For example, if a digital asset includes a group of images, then scene metadata for the group of images can be determined using detected objects in images. For more specific example, the presence of a large cake with candles and balloons in at least two images in the group can be used to determine that the scene for the group of images is a birthday celebration. Object metadata refers to one or more detected objects associated with one or more digital assets (e.g., a detected animal, a detected company logo, a detected piece of furniture, etc.). Content metadata refers to features of digital assets (e.g., pixel characteristics, pixel intensity values, luminescence values, brightness values, loudness levels, etc.). Sound metadata refers to one or more detected sounds associated with one or more digital assets (e.g., detected sound is a human's voice, a detected sound as a fire truck's siren etc.).

Auxiliary primitive metadata includes, but is not limited to, the following: (i) a condition associated with capturing the one or more digital assets; (ii) the condition associated with modifying one or more digital assets; and (iii) a condition associated with storing or retrieving one or more digital assets. As used herein "inferred metadata" refers to additional information about one or more digital assets that is beyond the information provided by primitive metadata. One difference between primitive metadata and inferred metadata is that primitive metadata represents an initial set of descriptions of one or more digital assets while inferred metadata provides additional descriptions of the one or more digital assets based on processing of one or more of the primitive metadata and contextual information. For example, primitive metadata can be used to identify detected persons in a group of images as John Doe and Jane duo, one inferred metadata may identify John Doe and Jane Doe as a married couple based on processing one or more of the primitive metadata (i.e., the initial set of descriptions and contextual information). In some embodiments, inferred metadata is formed from at least one of: (i) a combination of different types of primitive metadata; (ii) a combination of different types of contextual information; (iii) or a combination of primitive metadata and contextual information. As used herein, "contacts" and its variations refer to any or all attributes of a user's device that includes or has access to a digital asset collection associated with the user, such as physical, logical, social, and/or other contact contextual information. As used herein, "contextual information" and its variation refer to metadata assets that describes or defines the user's context or context of a user's device that includes or has access to a digital asset collection associated with the user. Exemplary contextual information includes, but is not limited to, the following: a predetermined time interval; an event scheduled to occur at a predetermined time interval; a geolocation to be visited at a predetermined time interval; one or more identified persons associated with a predetermined time; an event scheduled for predetermined time, or geolocation to be visited a predetermined time; whether metadata describing whether associated with a particular period of time (e.g., rain, snow, windy, cloudy, sunny, hot, cold, etc.); Season related metadata describing a season associated with capture of the image. For some embodiments, the contextual information can be obtained from external sources, a social networking application, a weather application, a calendar application, and address book application, any other type of application, or from any type of data store accessible via wired or wireless network (e.g., the Internet, a private intranet, etc.).

Primary inferred metadata can include event metadata describing one or more events associated with one or more digital assets. For example, if a digital asset includes one or more images, the primary inferred metadata can include event metadata describing one or more events where the one or more images were captured (e.g., vacation, a birthday, a sporting event, a concert, a graduation ceremony, a dinner, project, a workout session, a traditional holiday etc.). Primary inferred metadata can in some embodiments, be determined by clustering one or more primary primitive metadata, auxiliary primitive metadata, and contextual metadata. Auxiliary inferred metadata includes but is not limited to the following: (i) geolocation relationship metadata; (ii) person relationship metadata; (iii) object relationship metadata; space and (iv) sound relationship metadata. Geolocation relationship metadata refers to a relationship between one or more known persons associated with one or more digital assets and on one or more meaningful locations associated with the one or more digital assets. For example, an analytics engine or data meeting technique can be used to determine that a scene associated with one or more images of John Doe represents John Doe's home. Personal relationship metadata refers to a relationship between one or more known persons associated with one or more digital assets and one or more other known persons associated with one or more digital assets. For example, an analytics engine or data mining technique can be used to determine that Jane Doe (who appears in more than one image with John Doe) is John Doe's wife. Object relationship metadata refers to relationship between one or more known objects associated with one or more digital assets and one or more known persons associated with one or more digital assets. For example, an analytics engine or data mining technique can be used to determine that a boat appearing in one or more images with John Doe is owned by John Doe. Sound relationship metadata refers to a relationship between one or more known sounds associated with one or more digital asset and one or more known persons associated with the one or more digital assets. For example, an analytics engine or data mining technique can be used to determine that a voice that appears in one or more videos with John Doe is John Doe's voice.

As explained above, inferred metadata may be determined or inferred from primitive metadata and/or contextual information by performing at least one of the following: (i) data mining the primitive metadata and/or contextual information; (ii) analyzing the primitive metadata and/or contextual information; (iii) applying logical rules to the primitive metadata and/or contextual information; or (iv) any other known methods used to infer new information from provided or acquired information. Also, primitive metadata can be extracted from inferred metadata. For a specific embodiment, primary primitive metadata (e.g., time metadata, geolocation metadata, scene metadata, etc.) can be extracted from primary inferred metadata (e.g., event metadata, etc.). Techniques for determining inferred metadata and/or extracting primitive metadata from inferred metadata can be iterative. For a first example, inferring metadata can trigger the inference of other metadata and so on primitive metadata from inferred metadata can trigger inference of additional inferred metadata or extraction of additional primitive metadata.

The primitive metadata and the inferred metadata described above are collectively referred to as the digital asset metadata. In some embodiments, the digital asset maintenance module/logic uses the digital asset metadata to generate a knowledge graph. All or some of the metadata network can be stored in the processing unit(s) and/or the memory. As used herein, a "knowledge graph," a "knowledge graph metadata network," a "metadata network," and their variations refer to a dynamically organized collection of metadata describing one or more digital assets (e.g., one or more groups of digital assets in a digital asset collection, one or more digital assets in a digital asset collection, etc.) used by one or more computer systems for deductive reasoning. In a metadata network, there is no digital assets—only metadata (e.g., metadata associated with one or more groups of digital assets, metadata associated with one or more digital assets, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the preceding example of databases. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referred information—they go beyond that and involve the extrapolation of data for inferring or determining additional data.

As explained in the preceding paragraph, a metadata network enables deep connections between metadata using multiple dimensions in the metadata network, which can be traversed for additionally deduced correlations. Each dimension in the metadata network may be viewed as a grouping of metadata based on metadata type. For example, a grouping of metadata could be all time metadata assets in a metadata collection and another grouping could be all geo-position metadata assets in the same metadata collection. Thus, for this example, a time dimension refers to all time metadata assets in the metadata collection and a geo-position dimension refers to all geo-position metadata assets in the same metadata collection. Furthermore, the number of dimensions can vary based on constraints. Constraints include, but are not limited to, a desired use for the metadata network, a desired level of detail, and/or the available metadata or computational resources used to implement the metadata network. For example, the metadata network can include only a time dimension, the metadata network can include all types of primitive metadata dimensions, etc. With regard to the desired level of detail, each dimension can be further refined based on specificity of the metadata. That is, each dimension in the metadata network is a grouping of metadata based on metadata type and the granularity of information described by the metadata. For a first example, there can be two time dimensions in the metadata network, where a first time dimension includes all time metadata assets classified by week and the second time dimension includes all time metadata assets classified by month. For a second example, there can be two geolocation dimensions in the metadata network, where a first geolocation dimension includes all geolocation metadata assets classified by type of establishment (e.g., home, business, etc.) and the second geolocation dimension includes all geolocation metadata assets classified by country. The preceding examples are merely illustrative and not restrictive. It is to be appreciated that the level of detail for dimensions can vary depending on designer choice, application, available metadata, and/or available computational resources.

The digital asset management module/logic can be configured to generate the metadata network as a multidimensional network of the digital asset metadata. As used herein, "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge labeled multigraphs, multipartite edge labeled multi-graphs and multilayer networks.

For one embodiment, the nodes in the metadata network represent metadata assets found in the digital asset metadata. For example, each node represents a metadata asset associated with one or more digital assets in a digital asset collection. For another example, each node represents a metadata asset associated with a group of digital assets in a digital asset collection. As used herein, "metadata asset" and its variation refer to metadata (e.g., a single instance of metadata, a group of multiple instances of metadata, etc.) Describing one or more characteristics of one or more digital assets in a digital asset collection. As such, there can be a primitive metadata asset, inferred metadata asset, a primary primitive metadata asset, and exhilarate primitive metadata asset, a primary inferred metadata asset, and/or and exhilarate inferred metadata asset. For a first example, a primitive metadata asset refers to a time metadata asset describing a time interval between Jun. 1, 2016 and Jun. 3, 2016 when one or more digital assets were captured. For a second example, a primitive metadata asset refers to a geo-position metadata asset describing one or more latitudes and/or longitudes where one or more digital assets were captured. For another example, an inferred metadata asset refers to an event metadata asset describing a vacation in Paris, France between Jun. 5, 2016 and Jun. 30, 2016 when one or more digital assets were captured.

In some embodiments, the metadata network includes two types of nodes: (i) moment nodes; and (ii) non-moment nodes. As used herein, a "moment" refers to a single event (as described by an event metadata asset) that is associated with one or more digital assets. For example, a moment refers to a vacation in Paris, France that lasted between Jun. 1, 2016 and Jun. 9, 2016. For example, the moment can be used to identify one or more digital assets (e.g., one image, a group of images, a video, a group of videos, a song, a group of songs, etc.) Associated with the vacation in Paris, France that lasted between Jun. 1, 2016 and Jun. 9, 2016 (and not with any other event). As used herein, a "moment node" refers to a node in a multidimensional network that represents a moment. Thus, a moment node referred to a primary inferred metadata asset representing a single event associated with one or more digital assets. Primary inferred metadata as described above. As used herein, a "non-moment node" refers to a node in a multidimensional network that does not represent a moment. Thus a non-moment node refers to at least one of the following: (i) a primitive metadata asset associate with one or more digital assets; or (ii) and inferred metadata asset associated with one or more digital assets that is not a moment (i.e., not an event metadata asset).

As used herein, an "event" in its variations refer to a situation or an activity occurring at one or more locations during a specific time interval. An event includes, but is not limited to the following: a gathering of one or more persons to perform an activity (e.g., a holiday, a vacation, a birthday, a dinner, a project, a workout session, etc.); a sporting event (e.g., an athletic competition etc.); a ceremony (e.g., a ritual of cultural significance that is performed on a special occasion, etc.); a meeting (e.g., a gathering of individuals engaged in some common interest, etc.); a festival (e.g., a gathering to celebrate some aspect in a community, etc.); a concert (e.g., an artistic performance, etc.); a media event (e.g., an event created for publicity, etc.); and a party (e.g., a large social or recreational gathering, etc.).

The knowledge graph can be generated and used by the processing system to perform digital asset management in accordance with an embodiment. Generating the metadata network, by the digital asset management module/logic, can include defining nodes based on the primitive metadata and/or the inferred metadata associated with one or more digital assets in the digital asset collection. As a digital asset management module/logic identifies more primitive metadata with the metadata associated with a digital asset collection and/or infers metadata from at least the primitive metadata, the digital asset management module/logic can generate additional nodes to represent the primitive metadata and/or the inferred metadata. Furthermore, as the digital asset management module/logic determines correlations between the nodes, the digital asset management module/logic can create edges between the nodes. Two generation processes can be used to generate the metadata network. The first generation process is initiated using a metadata asset that does not describe a moment (e.g., primary primitive metadata asset, and auxiliary primitive metadata asset, and auxiliary inferred metadata asset, etc.). The second generation process is initiated using a metadata asset that describes a moment (e.g., event metadata). Each of these generation processes are described below.

For the first generation process, the digital asset management module/logic can generate a non-moment node to represent metadata associated with the user, a consumer, or an owner of a digital asset collection associated with the metadata network. For example a user can be identified as Jean DuPont. One embodiment, the digital asset management module/logic generates the non-moment node to represent the metadata provided by the user (e.g., Jean DuPont, etc.) via an input device. For example, the user can add at least some of the metadata about himself or herself to the metadata network via an input device. In this way, the digital asset management module/logic can use the metadata to correlate the user with other metadata acquired from a digital asset collection for example, the metadata provided by the user Jean DuPont can include one or more of his name's birthplace (which is Paris, France), his birthdate (which is May 27, 1991), his gender (which is male), his relations status (which is married), his significant other or spouse (which is Marie Dupont), and his current residence (which is in Key West, Fla., USA).

With regard to the first generation process, at least some of the metadata can be predicted based on processing performed by the digital asset management module/logic. The digital asset management module/logic may predict metadata based on analysis of metadata access the application or metadata and a data store (e.g., memory). For example, the digital asset management module/logic may predict the metadata based on analyzing information acquired by accessing the user's contacts (via a contacts application), activities (the account or application or an organization application should), contextual information (via sensors or peripherals) and/or social networking data (via social networking application).

In some embodiments, the metadata includes, but is not limited to, other metadata such as a user's relationship with others (e.g., family members, friends, coworkers, etc.), the user's workplaces (e.g., past workplaces, present workplaces, etc.), Places visited by the user (e.g., previous places visited by the user, places that will be visited by the user, etc.). For one embodiment, the metadata can be used alone or in conjunction with other data to determine or infer at least one of the following: (i) vacations or trips taken by Jean Dupont (e.g., nodes); days of the week (e.g., weekends, holidays, etc.); locations associated with Jean Dupont (e.g., nodes); Jean Dupont's social group (e.g., his wife Marie Dupont); Jean Dupont's professional or other groups (e.g., groups based on his occupation, etc.); types of places visited by Jean Dupont (e.g., Prime restaurant represented in node, Home represented by node, etc.); activities performed (e.g., a work-out session, etc.); etc. The preceding examples are illustrative and not restrictive.

For the second generation process, the metadata network may include at least one moment node. For this second generation process, the digital asset management module/logic generates the moment node to represent one or more primary inferred metadata assets (e.g., an event metadata asset, etc.). The digital asset management module/logic can determine or infer the primary inferred metadata (e.g., an event metadata asset, etc.) From one or more information, the metadata, or other data received from external sources (e.g., whether application, calendar application, social networking application, address books, etc. Also, the digital asset management module/logic may receive the primary inferred metadata assets, generate this metadata as the moment node and extract primary primitive metadata from the primary inferred metadata assets represented as the moment node.

The knowledge graph can be obtained from memory. Additionally, or alternatively, the metadata network can be generated by processing units. The knowledge graph is created when a first metadata asset (e.g., a moment node, non-moment node, etc.) is identified in the multidimensional network representing the metadata network. For one embodiment, the first metadata can be represented as a moment node. For this embodiment the first metadata asset represents a first event associated with one or more digital assets. A second metadata asset is identified or detected based at least on the first metadata asset. The second metadata asset may be identified or detected in the metadata network is a second node (e.g., a moment node in moment node, etc.) based on the first nose used to represent the first metadata asset in some embodiments, the second metadata asset is represented as a second moment node that differs from the first moment node. This is because the first moment node represents a first event metadata asset that describes a first a second event associated with one or more digital assets where the second moment node represents a second event metadata asset that describes the second event associated with one or more digital assets.

In some embodiments, identifying the second metadata asset (e.g., a moment node, etc.) is performed by determining that the first and second metadata assets share a primary primitive metadata asset, a primary inferred metadata asset, an auxiliary primitive metadata asset, and/or an auxiliary inferred metadata asset even though some of their metadata differ. Further explanation for using or generating a knowledge graph can be found in U.S. patent application Ser. No. 15/391,276, filed Dec. 27, 2016, entitled "Knowledge Graph Metadata Network Based on Notable Moments," which is incorporated by reference in its entirety and for all purposes.

FIG. 1 illustrates an exemplary schema for disambiguation of clustered occurrence identifiers. A cluster can be a group of digital asserts having similar properties such as location, date, time, or category. FIG. 1 illustrates a moment 102 in a knowledge graph for a digital asset. The exemplary technique determines that the moment 102 can be described as a public event 104. A "moment" refers to a single event (as described by an event metadata asset) that is associated with one or more digital assets. An occurrence identifier can be used to identify the event, location, date, venue, performers for an event. By way of example the public event 104 described in FIG. 1 is a basketball game between the Warriors and the Pacifists. Once determined to be originating from a public event 104 the digital asset can be analyzed to determine a category 110 for the event or occurrence. Some example categories can include music concerts, festivals and fairs, nightlife, sporting event, theater, dance, and arts and museum. The public event 104 can be analyzed and tagged with one of the categories 104 listed. By way of example, the public event listed in FIG. 1 is categorized a sporting event.

FIG. 1 also illustrates that the public event 104 can be sub-categorized as well. Some exemplary subcategories can include NBA game 106 or basketball 106. The performers of a public event 104 can also can also be identified in the metadata. For example for the Warriors versus pacifists basketball game, the first performer 112 would be the Warriors. The second performer would be the pacifists 114. Disambiguation of the public event 104 can be used for searching for digital assets for the public event 104 using only attributes for the event. The results of the disambiguation can be made available to clients seeking to receive information if the user has attended an event. Some example applications include the Search, Memories, and a digital asset library. Users can search for digital assets for public events by event name, performer name, and category. It can be desirable to have a high recall rate for Search queries with as few false positives as possible. A digital asset library can be created using public events 104. The digital asset library can use custom titles, similar to Memories, but with additional Titles. A title can be an event name, all the performers, or the most precise category plus the point of interest. A public event 104 in the graph can include the following information: Event name (e.g., "Madonna in Concert"); Performers (e.g., "Madonna," or "Sting"); Managed Category (e.g., MusicConcert); Localized Categories (e.g., "Music Concert," "Pop Concert,"); expected attendance (e.g., 125,000); or venue (e.g., "AT&T Park").

According to some embodiments, the digital asset library fetches public events 104 from Maps for each consolidated address. In some embodiments, the results can be cached locally for a period of time (e.g., 90 days) to ensure quick access and reduce network load.

In some embodiments, the techniques include transmitting a request, to a second location service, the second location service tracking a history of geographic locations for the computing device over time, the request to the second location service requesting a length of time the computing device was located within a specified distance from the plurality of location identifiers within the target range of the first geographic location. The techniques can further include modifying the confidence metric based at least in part on the length of time the computing device spent within the specified distance from the plurality of location identifiers within the target range of the first geographic location.

Figure 2:
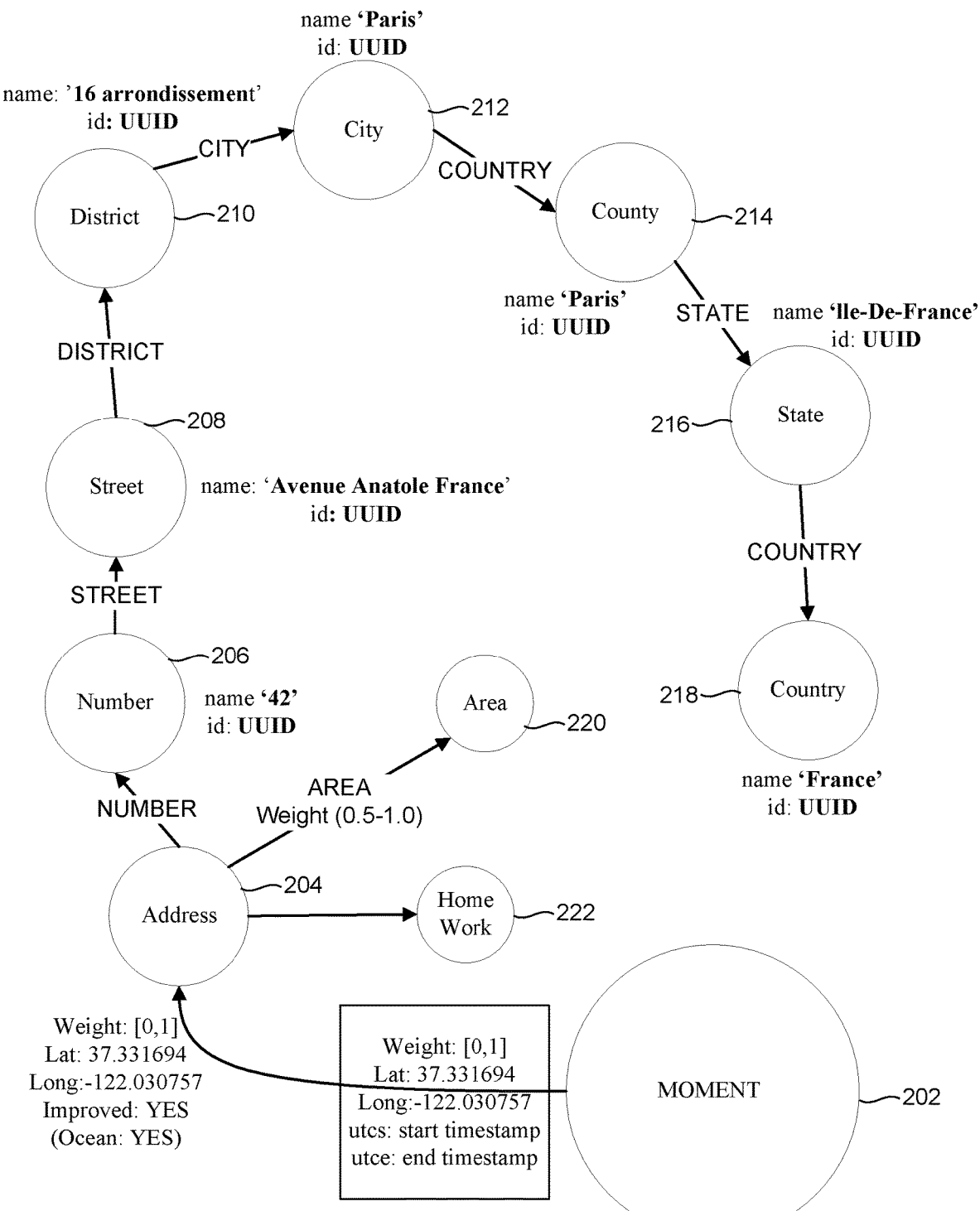
FIG. 2 illustrates an exemplary scheme for disambiguation of location information.

FIG. 2 demonstrates an example of point of interest disambiguation techniques. A moment 202 in a knowledge graph can include metadata indication location coordinates (e.g., geographic latitude and longitude coordinates) that identified the location where a digital asset was captured. The moment 202 can also include temporal coordinates to identify a start time and an end time or a digital asset (e.g., a video). The temporal coordinates can be stored using universal coordinated time (UTC). In some embodiments, the location and temporal coordinates can be stored on the computing device. In some embodiments, the location and temporal coordinates can be stored in a cloud database accessible by the computing device.

In some embodiments, the one or more processors of the can use the location coordinates to query a map database over a network such as the internet. The map database can return an address 204. In FIG. 2 the exemplary address is "42 Avenue Anatole France, Paris." The address query 204 can be further broken down into various individual components. The number 206 can return the numerical portion of the street address. In the example in FIG. 2, the number returned is "42." The street query 208 can return the street name of the address 204. In the example in FIG. 2, the street returned is "Avenue Anatole France." The district query 210 can return the district for the address 204. In the example in FIG. 2, the district returned is "16 arrondissement." The city query 212 can return the name of the city of the address 204. In the example in FIG. 2, the city name returns is "Paris." The county query 214 can return the county for the address 204. In the example in FIG. 2, the county name returned is "Paris." The state query 216 can return the state for the address 204. In the example in FIG. 2, the state returned is "lle-De-France." The country query 218 can return the country for the address 204. In the example in FIG. 2, the country returned is "France."

Figure 3:
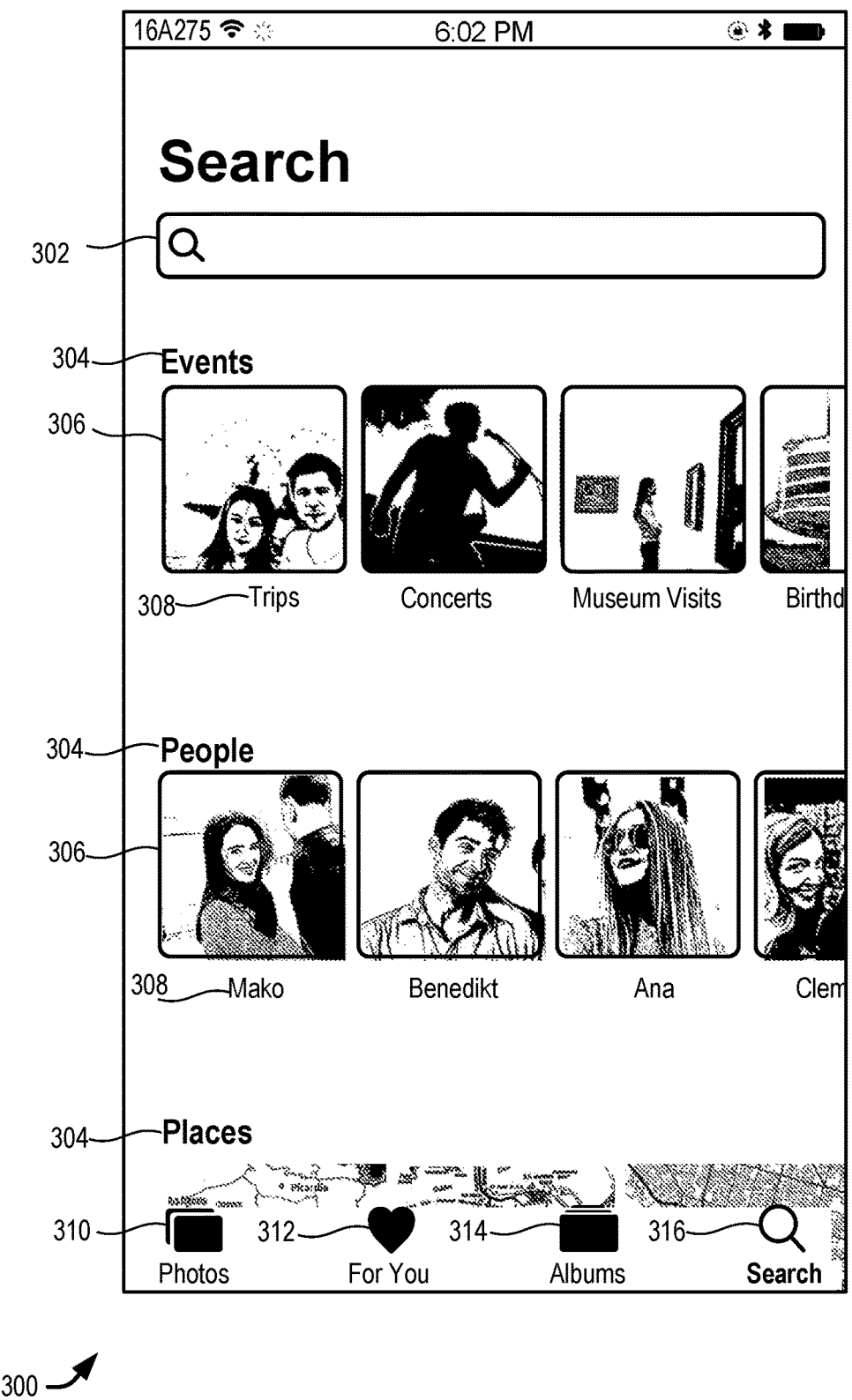
FIG. 3 illustrates an example user interface for digital asset search, specifically an example of a digital assets search page, in accordance with at least one embodiment.

FIG. 3 illustrates an example user interface for digital asset search, specifically an example of a digital assets search page, in accordance with at least one embodiment. The user interface 300 depicted in FIG. 3 can be accessed by selecting the magnifying glass search icon on the digital assets home page. The user interface 300 presents a search field 302 in a first area of the display. The exemplary user interface 300 depicts collections of digital assets for Events, People, Places (partially depicted), Categories (not depicted), and Groups (not depicted). The Places, Categories, and Groups collects can be accessed by swiping down using a hand gesture on the touchscreen display.

The Events collection with associated collection identifier 304 presents a plurality of multimedia content icons 306 and associated keyword tags 308, where each multimedia content icon 306 and associated keyword tag 308 represents a collection of digital assets stored in the digital asset collection. The multimedia content icon 306 illustrates an exemplary thumbnail for the collection. Each digital asset includes corresponding metadata that associates the digital asset with an event described by the associated keyword tag 308. For example, the first keyword tag is labeled "Trips" and selecting the associated multimedia content icon 306 for "Trips" would result in filtering the digital assets to exclude any assets not related to an event labelled "Trips." The other exemplary keyword tags for listed in FIG. 3 include "Concerts," "Museum Visits" and "Birthdays." In some embodiments, additional Events multimedia content icons 306 and associated keyword tags 308 can be displayed by scrolling to the right on the tough screen display through a hand gesture. The search engine references the knowledge graph to determine the multimedia content icons 306 and keyword tags 308 based on a plurality of metadata for each of the digital assets in the digital asset collection. The keyword tags 308 are associated by the metadata of the digital assets in the digital asset collection.

The People collection with associated content identifier 304 presents a plurality of multimedia content icons 306 and associated keyword tags 308, where each multimedia content icon 306 and associated keyword tag 308 represents a collection of digital assets stored in the digital asset collection. Each digital asset contains metadata that associates the digital asset with a person or persons depicted in the multimedia content icon 306 and associated keyword tag 308. For example, the first multimedia content icon 306, depicted in FIG. 3, has an associated keyword tag 308 labeled "Mako" and selecting the associated multimedia content icon 306 would result in filtering the digital assets to exclude any assets not related to "Mako." FIG. 3 provides other exemplary collections labelled "Benedikt," "Ana," and "Clem." In some embodiments, additional People multimedia content icons 306 and associated keyword tags 308 can be displayed by scrolling to the right on the tough screen display through a hand gesture. In some embodiments, the keyword tag 308 is associated with images of persons stored in a contact list of the computing device. In some embodiments, the keyword tag receives information from image analysis and a correlation with other labeled digital assets stored in the digital asset collection. In some embodiments, a user may identify the assets by storing them an a digital asset folder that may be labeled with the identity of the person in the image.

The Places collection with associated content identifier 304 is also displayed. The search user interface 300 depicts a plurality of icons allowing for additional organizational tools for management of the digital asset collection. The icons can include an "Photos" icon 310, a "Favorites" icon (labelled "For You") 312, an "Albums" icon 314, and a "Search" icon 316. As shown in FIG. 3, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order.

Figure 4:
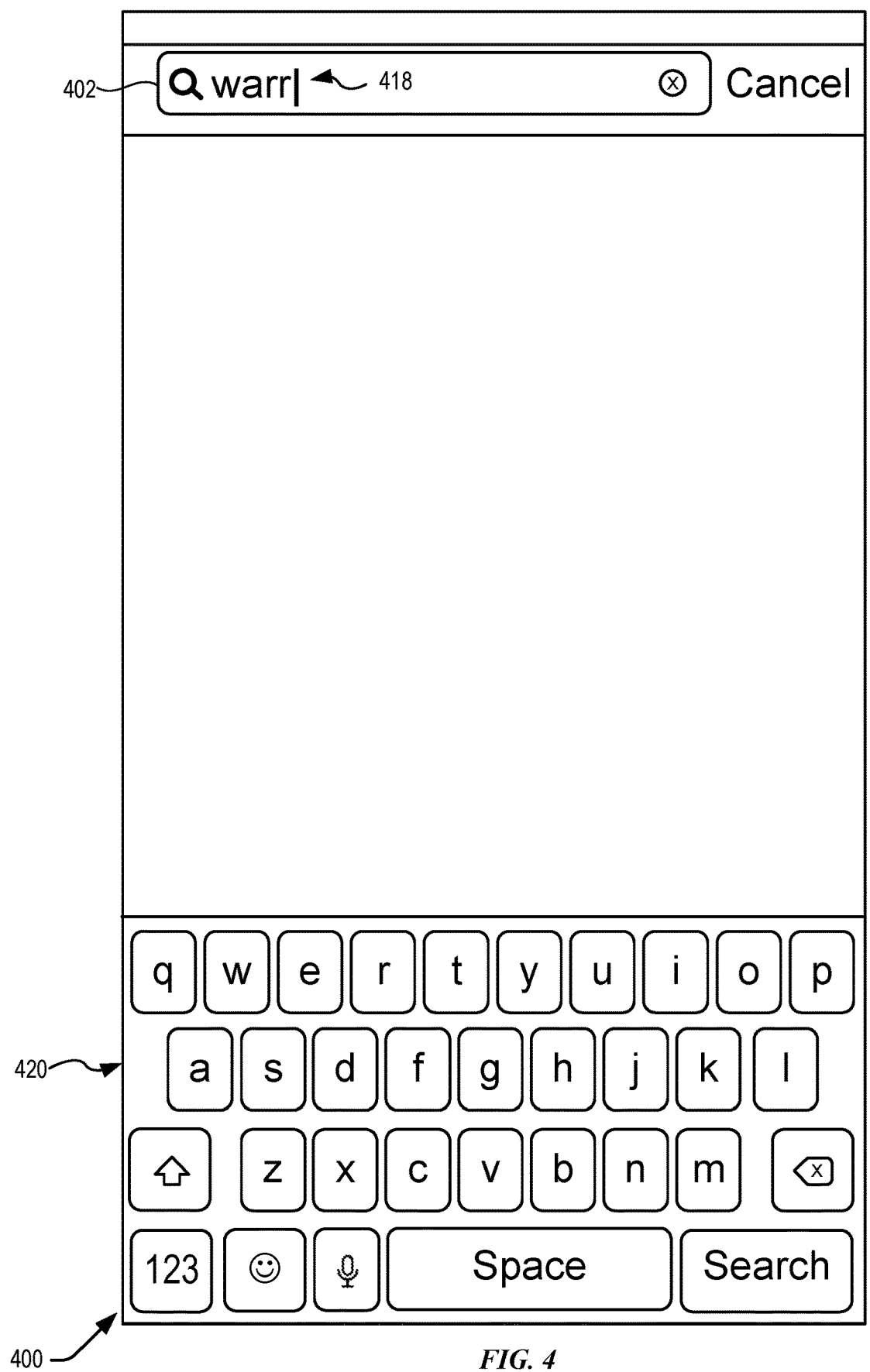
FIG. 4 illustrates another example user interface for digital asset search, specifically a search entry page, in accordance with at least one embodiment.

FIG. 4 illustrates another example user interface for digital asset search, specifically a search entry page, in accordance with at least one embodiment. FIG. 4 illustrates a user interface 400 for entering search terms for a digital asset search. In FIG. 4, the exemplary text entry 418 is "warr" which is the beginning of a search term for "Warriors" that can be entered into a search field 402. The text entry 418 can be entered using a virtual keyboard 420. In some embodiments, the entry can be made via a voice command using a virtual assistant. In some embodiment, the virtual keyboard can be entered by selecting the search field 402.

Figure 5:
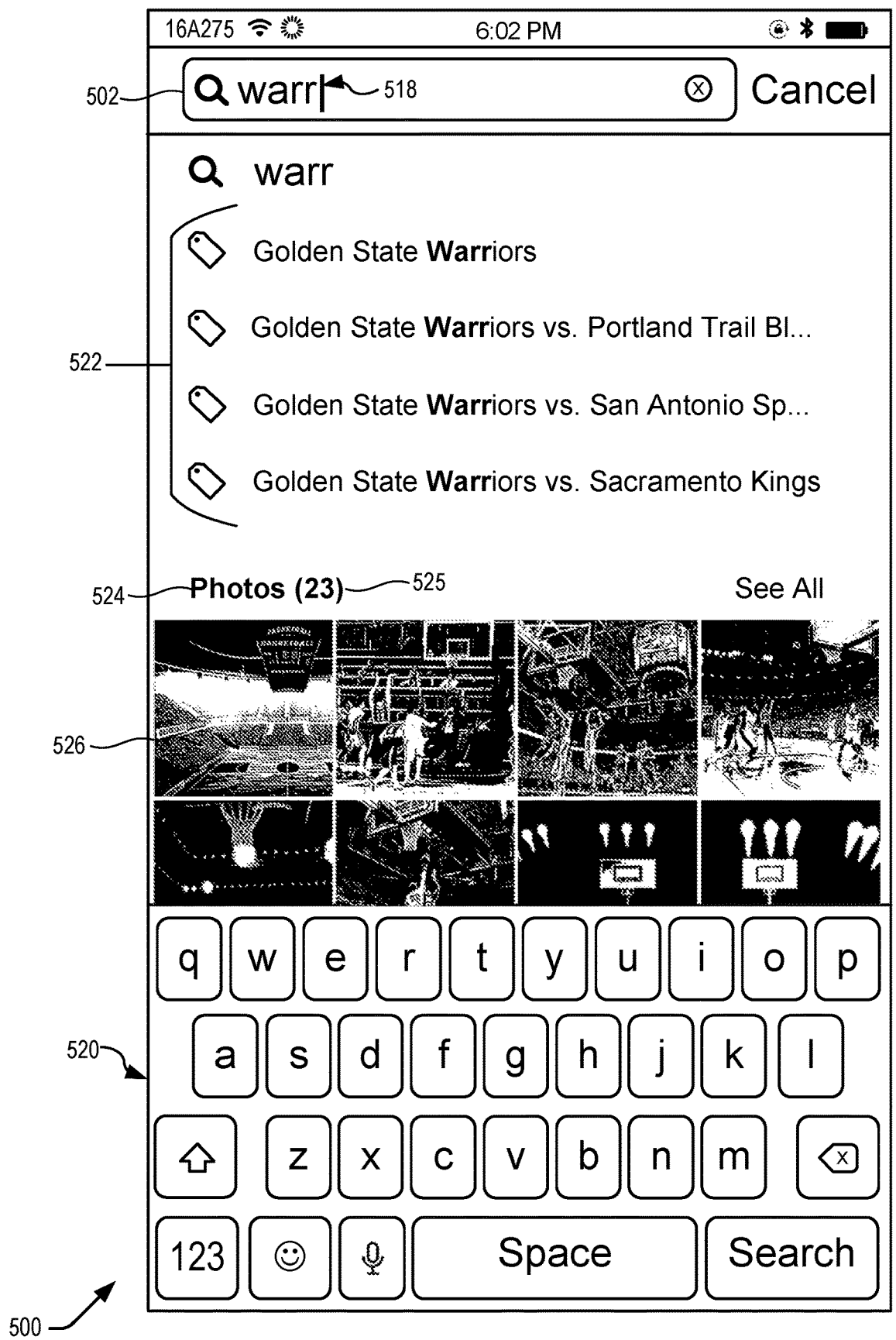
FIG. 5 illustrates another example user interface for digital asset search, specifically a suggestions page, in accordance with at least one embodiment.

FIG. 5 illustrates another example user interface for digital asset search, specifically a suggestions page, in accordance with at least one embodiment. The user interface 500 allows a user to further refine a search of the digital asset collection. Similar to user interfaces 300 and 400, a search field 502 is depicted in one area of the display. Upon entering search text entry 518 into the search field 502, the digital asset search techniques will suggest possible search terms to return digital assets. Suggested search terms 522 provide the user the ability to further refine the search based on metadata for the suggested search terms 522. In FIG. 5, the example user interface 500 suggests the following scenes: "Golden State Warriors," "Golden State Warriors vs. Portland Trailblazers," "Golden State Warriors vs. San Antonio Spurs," and "Golden State Warriors vs. Sacramento Kings." These are all examples of scenes for different Golden State Warrior games. Selecting any one of the suggested scenes will return digital assets with metadata associated with the Golden State Warriors. Selecting the "Golden State Warriors vs. Portland Trailblazers" would result in displaying results with metadata associated related to the "Golden State Warriors vs. Portland Trailblazers" game. The Photos identifier 524 lists the type of digital assets with metadata associated with the search text entry 518. The asset quantity number 525 indicates the number of digital assets for the Photo identifier 524. In the example in FIG. 5, there are 23 photos responsive to the "warr" textual search term entry 518. One exemplary digital asset 526 is a digital photo of a basketball game.

FIG. 5 also depicts digital assets in two rows underneath the Photos identifier 524. Underneath the Top 8 digital assets is a virtual keyboard 520 for entry of the search text entry 518 into the search field 502.

Figure 6:
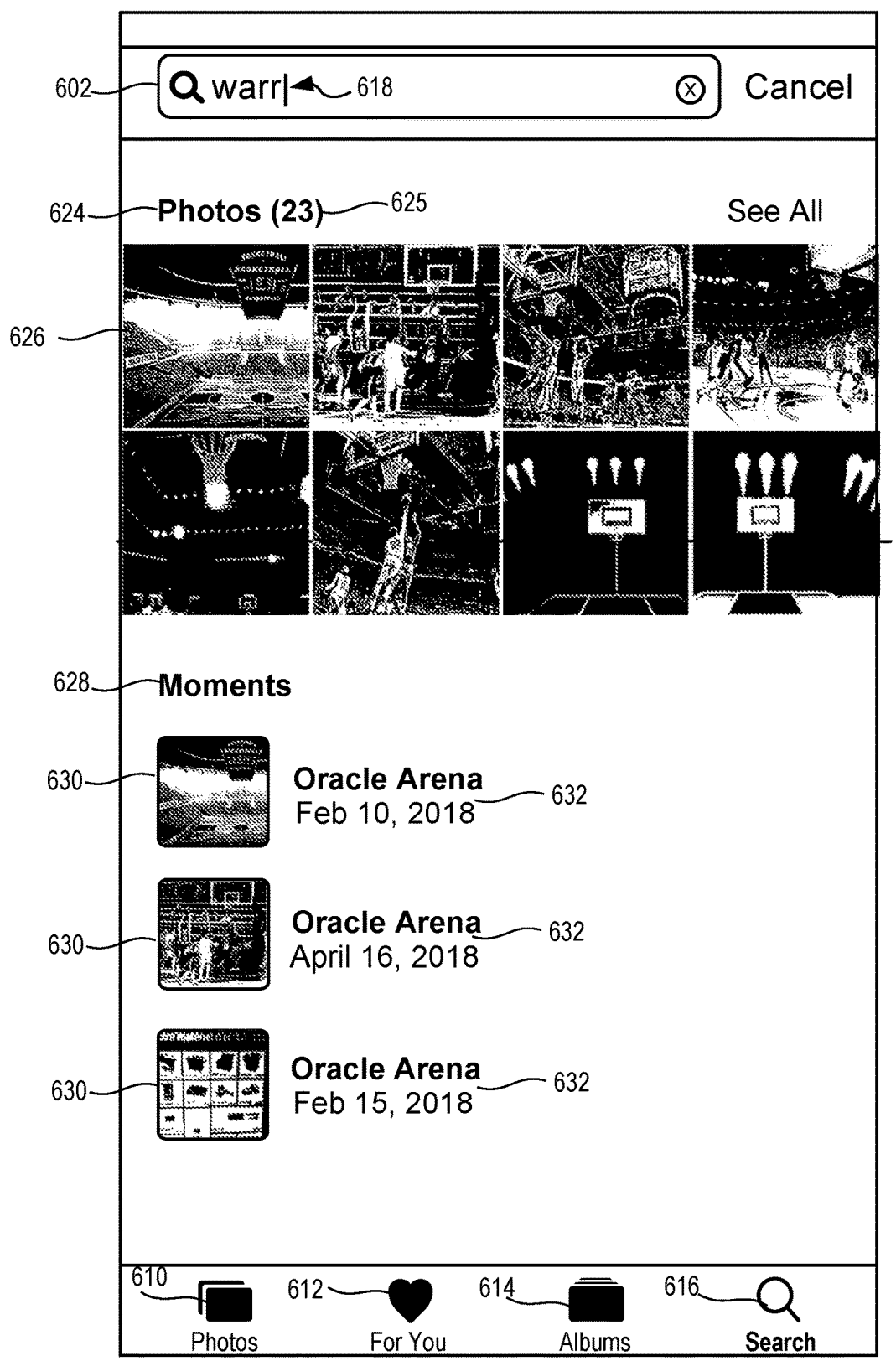
FIG. 6 illustrates another example user interface for digital asset search, specifically another example of a suggestions and moments page, in accordance with at least one embodiment.

FIG. 6 illustrates another example user interface for digital asset search, specifically another example of a suggestions and moments page, in accordance with at least one embodiment. FIG. 6 illustrates a user interface 600 allows a user to further refine a search of the digital asset collection. Similar to user interfaces 300, 400, and 500, a search field 602 is depicted in one area of the display. In FIG. 6, "warr" is displayed as the exemplary text entry 618, which is the beginning of a search term for "Warriors" that can be entered into a search field 602. FIG. 6 also displays the Photos identifier 624 lists the type of digital assets with metadata associated with the search term entry 618. The asset quantity number 625 indicates the number of digital assets for the Photo identifier 624. In the example in FIG. 6, there are 23 photos responsive to the "warr" textual search term entry 618.

FIG. 6 also depicts a Moments indicator 628. A moment is a collection of digital assets associated with each other both temporally and geographically. A plurality of moment multimedia content icons 630. Each moment multimedia content icon 630 depicts a representative image from the digital assets associated with the moment and a keyword tag 632 identifier that identifies a location and date associated with the digital assets associated with the moment. Selection of any one of these moment multimedia content icons 630 would further limit the search of the digital asset collection and return only digital assets that relate to both the location and temporal limitation associated with the moment. For example, selecting "Oracle Area, Feb. 10, 2018" would result in only returning digital assets identified as being associated with both location metadata associated with "Oracle Arena" and temporal metadata associated with the date "Feb. 10, 2018." The digital asset management module/logic through access of the knowledge graph decides which multimedia content icons 630 and associated keyword tags 632 to display and in which order the multimedia content icons 630 and associated keyword tags 632 are displayed. Further, the digital asset management module/logic through access of the knowledge graph decides the range of temporal metadata to include for a specific moment and the range of location metadata for identifying the location of the moment.

The user interface 600 depicts a plurality of icons allowing for additional organizational tools for management of the digital asset collection. The icons can include an "Photos" icon 610, a "Favorites" icon (labelled "For You") 612, an "Albums" icon 614, and a "Search" icon 616. As shown in FIG. 6, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order.

Figure 7:
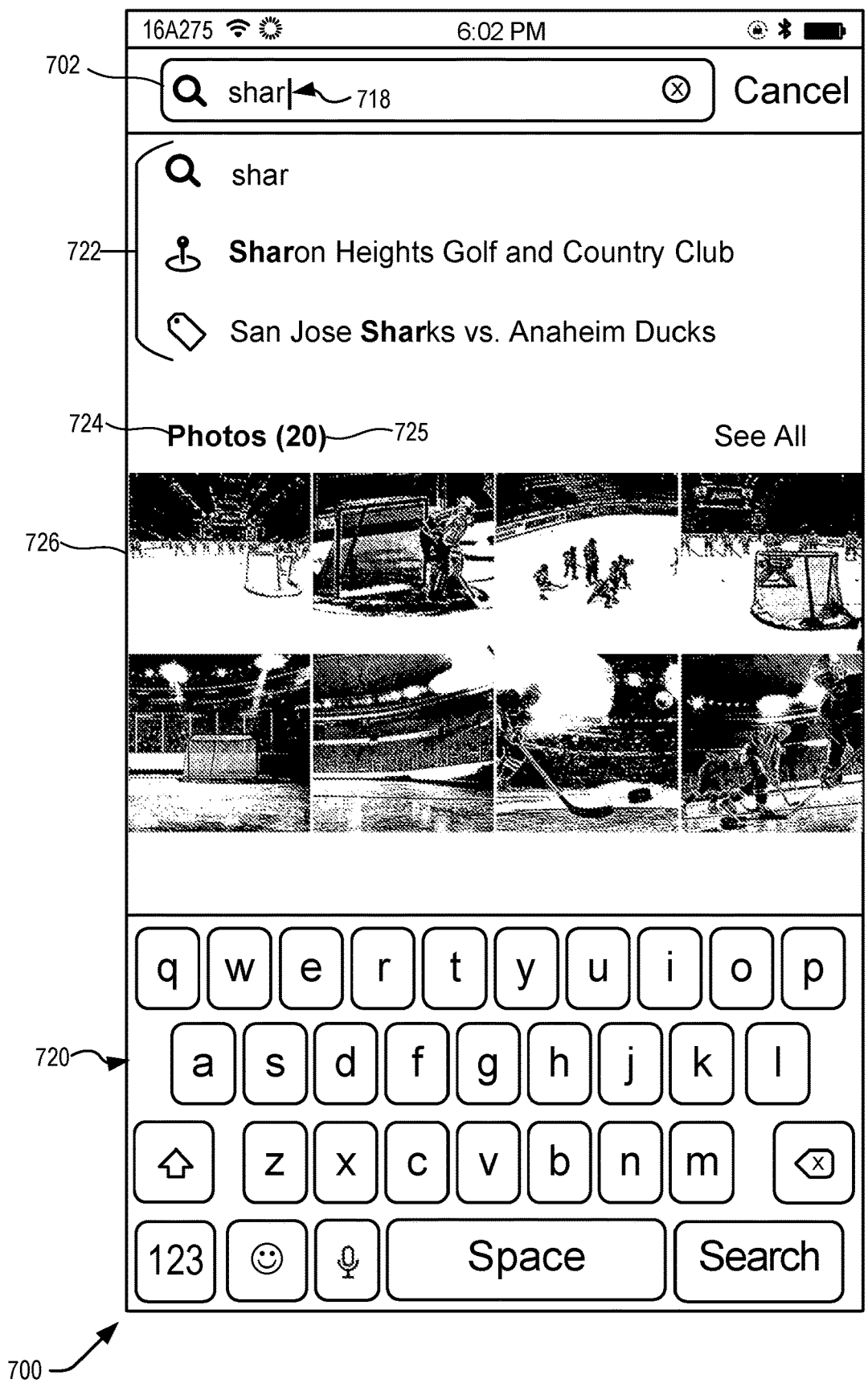
FIG. 7 illustrates another example user interface for digital asset search, specifically a suggestions page, in accordance with at least one embodiment.

FIG. 7 illustrates another example user interface for digital asset search, specifically a suggestions page, in accordance with at least one embodiment. FIG. 7 illustrates a user interface 700 allows a user to further refine a search of the digital asset collection. Similar to user interfaces 300, 400, 500, and 600 a search field 702 is depicted in one area of the display. In FIG. 7, "shar" is displayed as the search text entry 718, which is the beginning of a search term for "Sharks" that can be entered into a search field 702. Upon entering search text entry 718 into the search field 702, the digital asset search techniques will suggest possible search terms to return digital assets. Suggested search terms 722 the ability to further refine the search based on the suggested search terms 722. In FIG. 7, the example user interface 700 suggests the point of interest "Sharon Heights Gold and Country Club" and the scene of "San Jose Sharks vs. Anaheim Ducks." Selecting any one of the suggested scenes will return digital assets with metadata associated with the Sharon Heights Golf and Country Club or the San Jose Sharks vs. Anaheim Ducks professional hockey game. The Photos identifier 724 lists the type of digital assets with metadata associated with the search text entry 718. The asset quantity number 725 indicates the number of digital assets for the Photo identifier 724. In the example in FIG. 7, there are 20 photos responsive to the "shar" textual search term entry 718. The search text entry 718 can be entered using a virtual keyboard 720. In some embodiment, the virtual keyboard can be entered by selecting the search field 702. One exemplary digital asset 726 is a digital photo of a Shark's hockey game.

Figure 8:
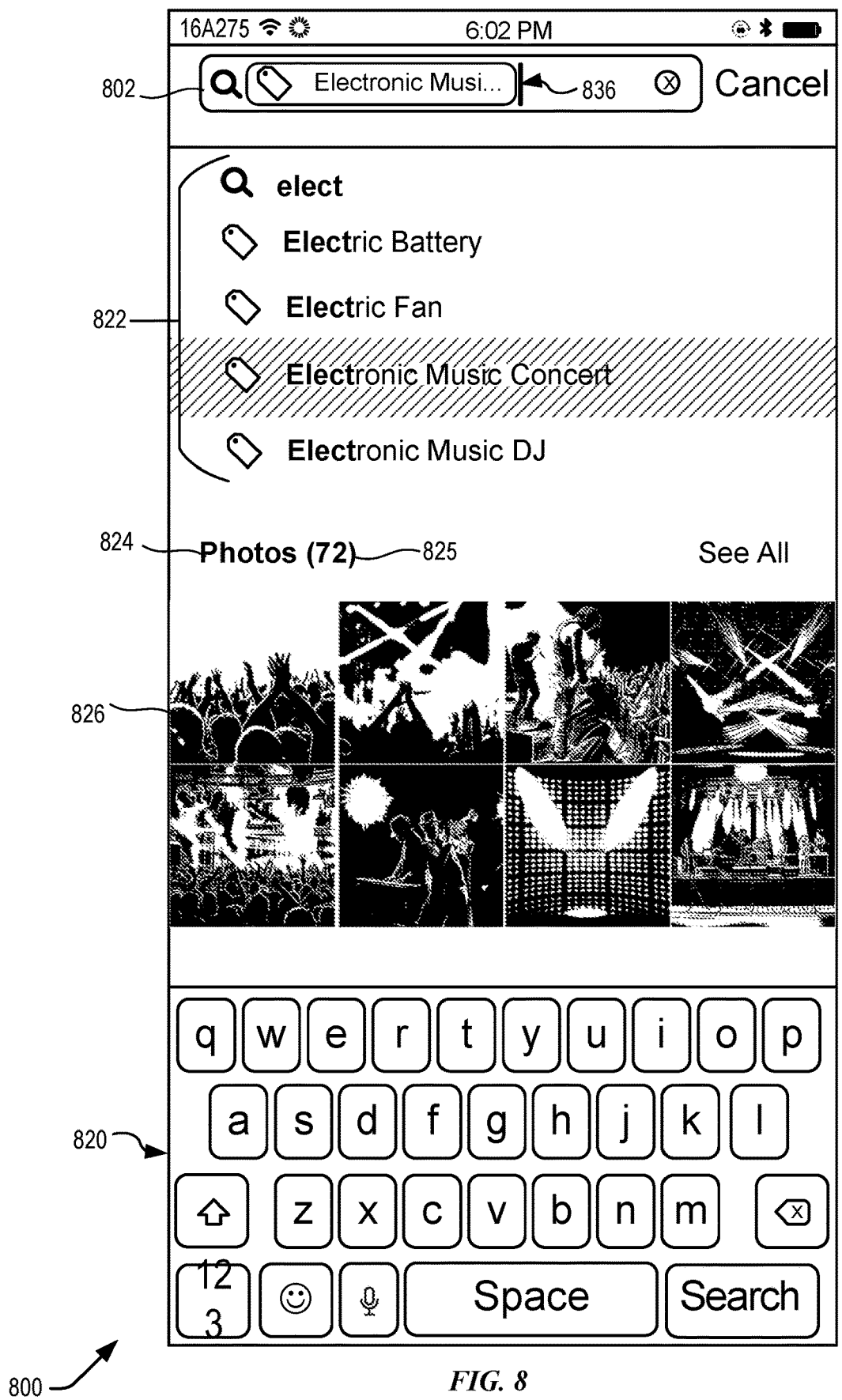
FIG. 8 illustrates another example user interface for digital asset search, specifically a suggestions page for a specific occurrence, in accordance with at least one embodiment.

FIG. 8 illustrates another example user interface for digital asset search, specifically a suggestions page, in accordance with at least one embodiment. The user interface 800 allows a user to further refine a search of the digital asset collection. Similar to user interface 300, 400, 500, 600 and 700 a search field 802 is depicted in one area of the display. Upon selection of one of the search suggestions 822 the digital asset management module/logic presents one or more additional search suggestions 822. In FIG. 8, the "Electronic Music Concert" search selection 836 is selected and is displayed in the search field 802. Further, the "Electronic Music Concert" is highlighted to indicate it was selected. By way of example, in FIG. 8, the Photos identifier 824 lists the type of digital assets with metadata associated with the search term selection 836. The asset quantity number 825 indicates the number of digital assets for the Photo identifier 824. In the example in FIG. 8, there are 72 photos responsive to the "Electronic Music Concert" search selection 836. Addition text can be entered into the search field 802 using a virtual keyboard 820. In some embodiment, the virtual keyboard 820 can be entered by selecting the search field 802. One exemplary digital asset 826 is a digital photo of an Electronic Music Concert.

Figure 9:
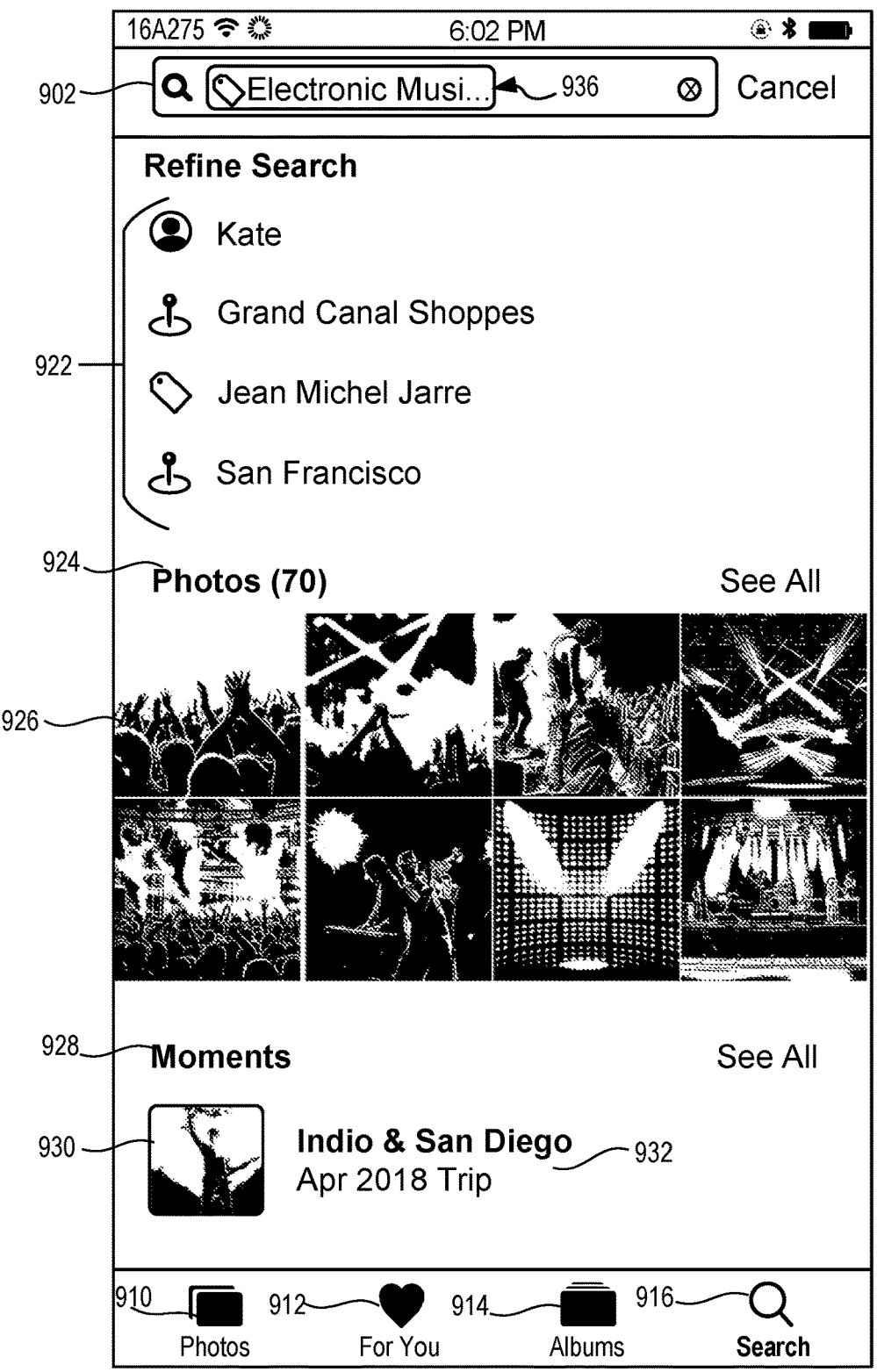
FIG. 9 illustrates another example user interface for digital asset search, specifically an example of keyword suggestion, in accordance with at least one embodiment.

FIG. 9 illustrates another example user interface for digital asset search, specifically an example of keyword suggestion, in accordance with at least one embodiment. The user interface 900 allows a user to further refine a search of the digital asset collection. Similar to user interface 300, 400, 500, 600, 700 and 800 a search field 902 is depicted in one area of the display. Upon selection of one of the search suggestions 922 the digital asset management module/logic presents one or more additional search suggestions 922. By way of example in FIG. 9, the "Electronic Music Concert" search selection 936 is selected and is displayed in the search field 902. The Refine Search suggestions 922 include a Person ("Kate"), a Place ("Grand Canal Shoppes"), a scene ("Jean Michel Jarree") and another Place ("San Francisco"). By way of example, in FIG. 9, the Photos identifier 924 lists the type of digital assets with metadata associated with the search term selection 936. The asset quantity number 925 indicates the number of digital assets for the Photo identifier 924. In the example in FIG. 9, there are 70 photos responsive to the "Electronic Music Concert" search selection 936. FIG. 9 presents the Top 8 digital assets 926 of responsive to the selected search criteria 936.

FIG. 9 also depicts a Moments indicator 928. A moment is a collection of digital assets associated with each other both temporally and geographically. A plurality of moment multimedia content icons 930. Each moment multimedia content icon 930 depicts a representative image from the digital assets associated with the moment and a keyword tag 932 identifier that identifies a location and date associated with the digital assets associated with the moment. Selection of any one of these moment multimedia content icons 930 would further limit the search of the digital asset collection and return only digital assets that relate to both the location and temporal limitation associated with the moment. In FIG. 9, the exemplary moment is "Indio & San Diego" from a concert during April 2018 trip. The user interface 900 depicts a plurality of icons allowing for additional organizational tools for management of the digital asset collection. The icons can include an "Photos" icon 910, a "Favorites" icon (labelled "For You") 912, an "Albums" icon 914, and a "Search" icon 916. As shown in FIG. 9, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order.

Figure 10:
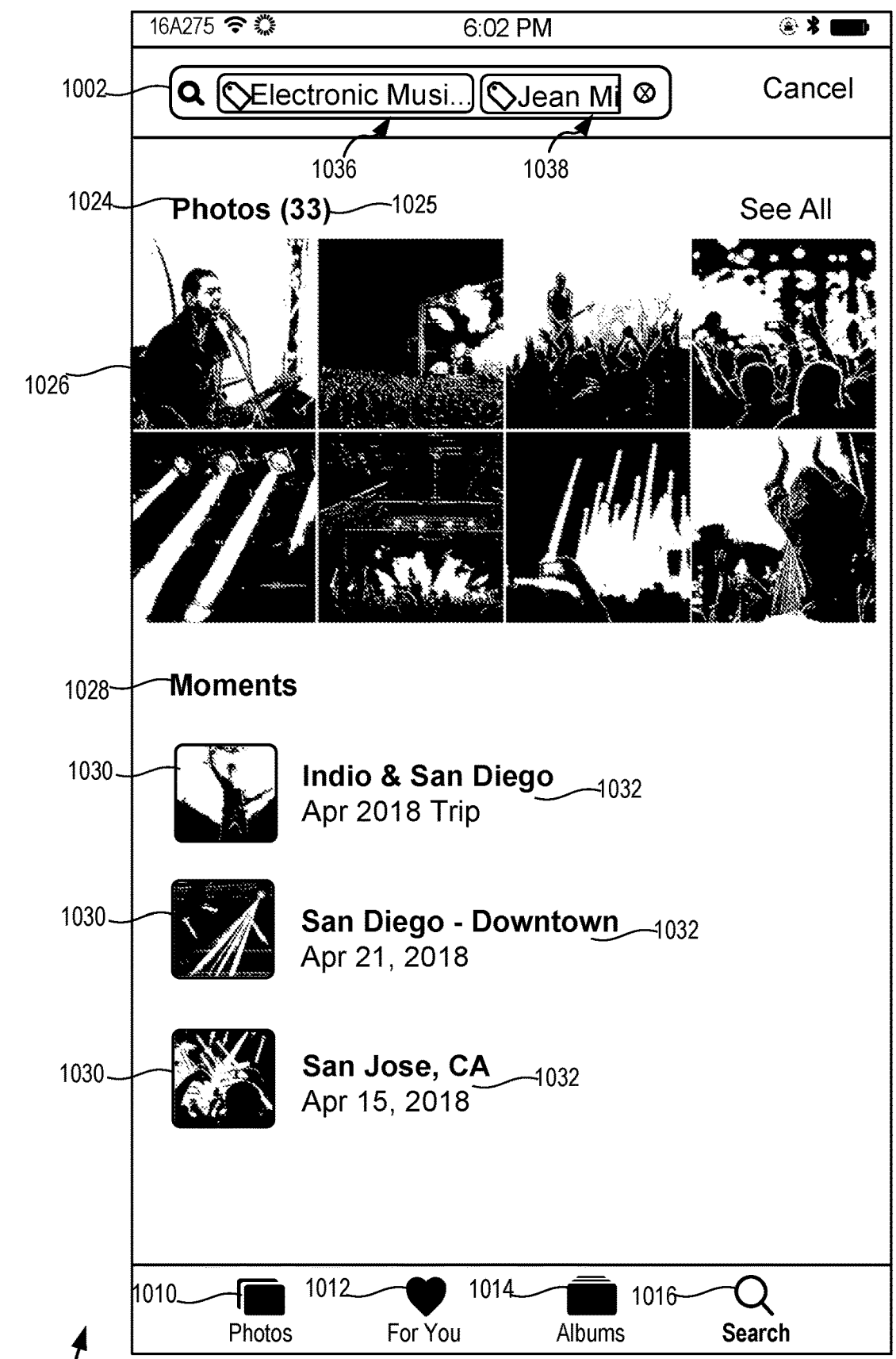
FIG. 10 illustrates another example user interface for digital asset search, specifically a results page, in accordance with at least one embodiment.

FIG. 10 illustrates another example user interface for digital asset search, specifically a results page, in accordance with at least one embodiment. The user interface 1000 displays results for the selected primary search criteria 1036 and a selected secondary search criteria 1038. Similar to user interface 300, 400, 500, 600, 700, 800, 900, and 1000 search field 1002 is depicted in one area of the display. By way of example in FIG. 10, the "Electronic Music Concert" primary search selection 1036 and "Jean Michel Jarret" secondary search selection 1038 is selected and is displayed in the search field 1002. By way of example, in FIG. 10, the Photos identifier 1024 lists the type of digital assets with metadata associated with the primary search selection 1036 and the secondary search selection 1038. By way of example, in FIG. 10, the Photos identifier 1024 lists the type of digital assets with metadata associated with the primary search term selection 1036. The asset quantity number 1025 indicates the number of digital assets for the Photo identifier 1024. In the example in FIG. 10, there are 33 photos responsive to the "Electronic Music Concert" primary search selection 1036 and "Jean Michel Jane" secondary search selection 1038.

In FIG. 10, the exemplary moments are "Indio & San Diego" from a concert during April 2018 trip, "San Diego-Downtown" on Apr. 21, 2018, and San Jose, Calif. on Apr. 15, 2018. The search user interface 1000 depicts a plurality of icons allowing for additional organizational tools for management of the digital asset collection. The icons can include an "Photos" icon 1010, a "Favorites" icon (labelled "For You") 1012, an "Albums" icon 1014, and a "Search" icon 1016. As shown in FIG. 10, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order. FIG. 10 presents the Top 8 digital assets 1026 of responsive to the selected primary search criteria 1036 and secondary search criteria 1038.

Figure 11:
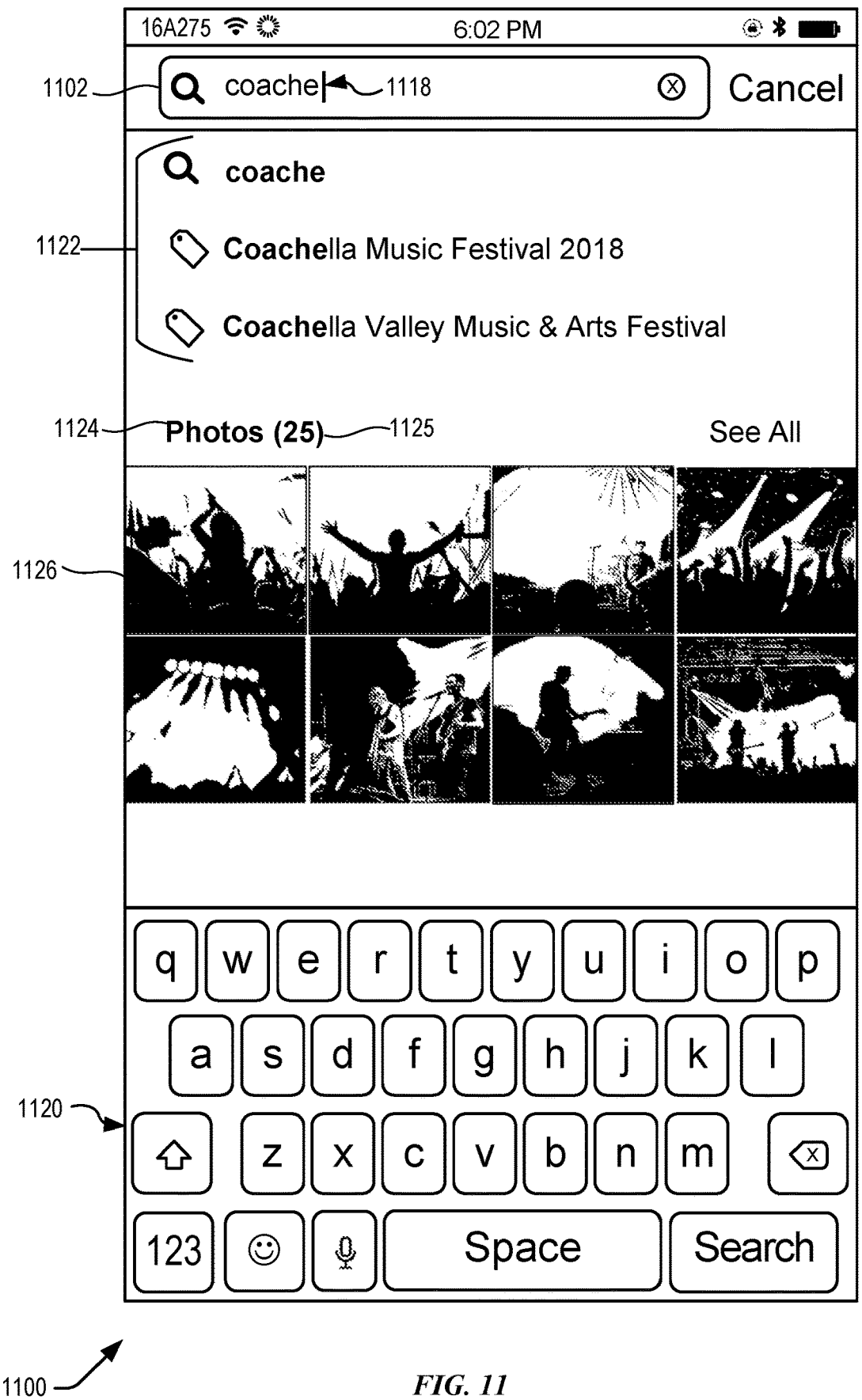
FIG. 11 another example user interface for digital asset search, specifically an example of keyword suggestion, in accordance with at least one embodiment.

FIG. 11 another example user interface for digital asset search, specifically an example of keyword suggestion for an event, in accordance with at least one embodiment. The user interface 1100 allows a user to further refine a search of the digital asset collection. Similar to user interface 300, 400, 500, 600, 700, 800, 900, and 1000 a search field 1102 is depicted in one area of the display. FIG. 11 illustrates a text entry 1118 of "coache" into the search field 1102. The digital asset management module/logic presents one or more additional search suggestions 1122. By way of example, the search suggestions 1122 include "Coachella Music Festival 2018" and "Coachella Valley Music & Arts Festival." By way of example, in FIG. 11, the Photos identifier 1124 lists the type of digital assets with metadata associated with the text entry 1118 into the search field 1102. By way of example, in FIG. 11, the Photos identifier 1124 lists the type of digital assets with metadata associated with the text search entry 1118. The asset quantity number 1125 indicates the number of digital assets for the Photo identifier 1124. In the example in FIG. 11, there are 25 photos responsive to the "coache" text search entry 1118. FIG. 11 presents the Top 8 digital assets 1126 of responsive to the text search entry 1118. In some embodiment, the virtual keyboard 1120 can be entered by selecting the search field 1102.

Figure 12:
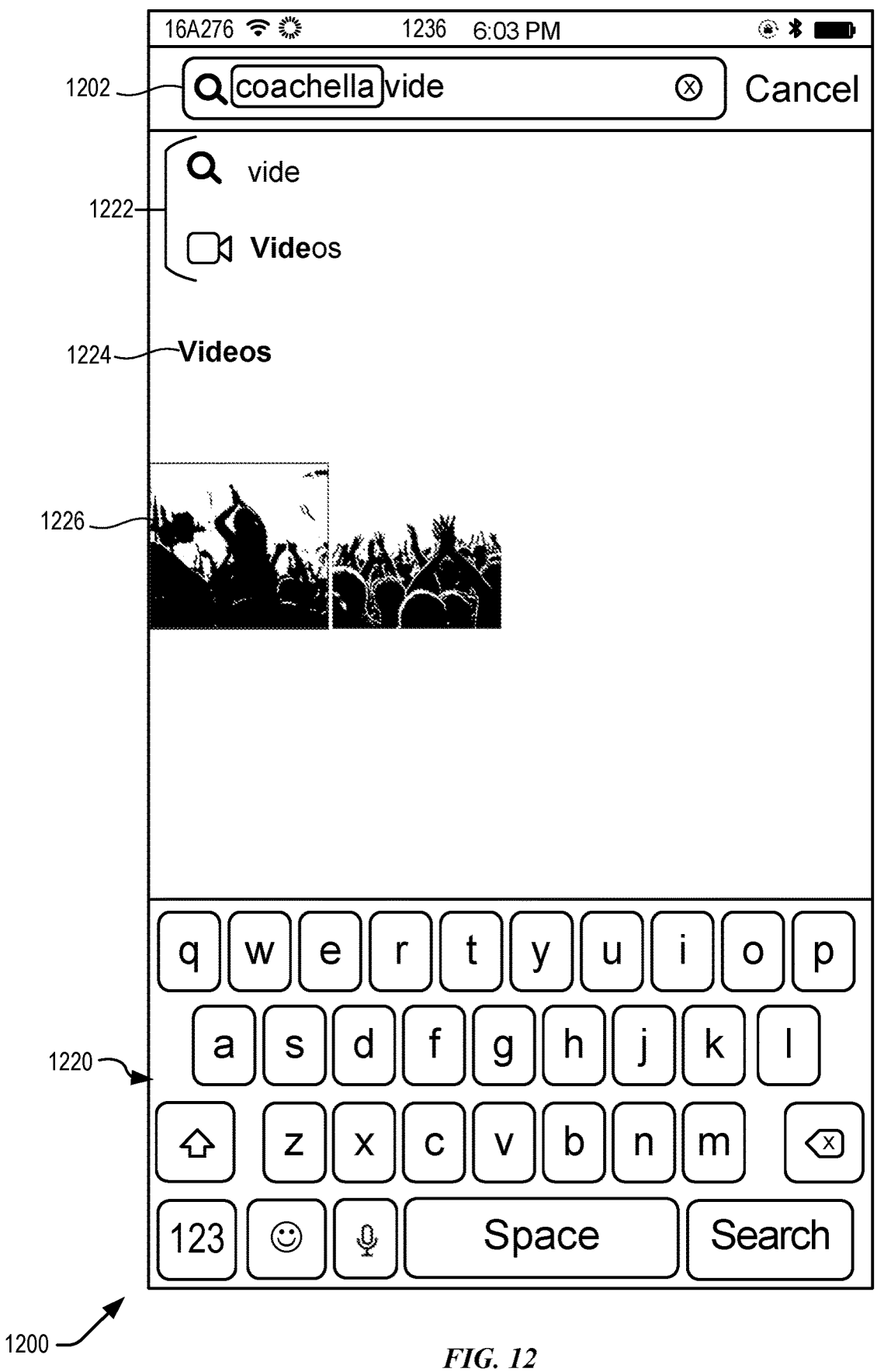
FIG. 12 illustrates another example user interface for digital asset search, specifically a videos results page, in accordance with at least one embodiment.

FIG. 12 illustrates another example user interface for digital asset search, specifically a videos results page, in accordance with at least one embodiment. The user interface 1200 allows a user to further refine a search of the digital asset collection. Similar to user interface 300, 400, 500, 600, 700, 800, 900, 1000, and 1100 a search field 1202 is depicted in one area of the display. FIG. 12 illustrates a text entry 1218 of "coache" and "vide" into the search field 1202. The digital asset management module/logic presents one or more additional search suggestions 1222. By way of example, the search suggestions 1222 include "vide" and "Videos." By way of example, in FIG. 12, the Videos identifier 1224 lists the type of digital assets with metadata associated with the text entry 1218 into the search field 1202 and also videos. By way of example, in FIG. 12, the Videos identifier 1224 lists the type of digital assets with metadata associated with the text search entry 1218. By way of example, there are two digital assets 1226, here videos, responsive to the "Coachella" and "vide" search criteria. In some embodiment, the virtual keyboard 1220 can be entered by selecting the search field 1202.

Figure 13:
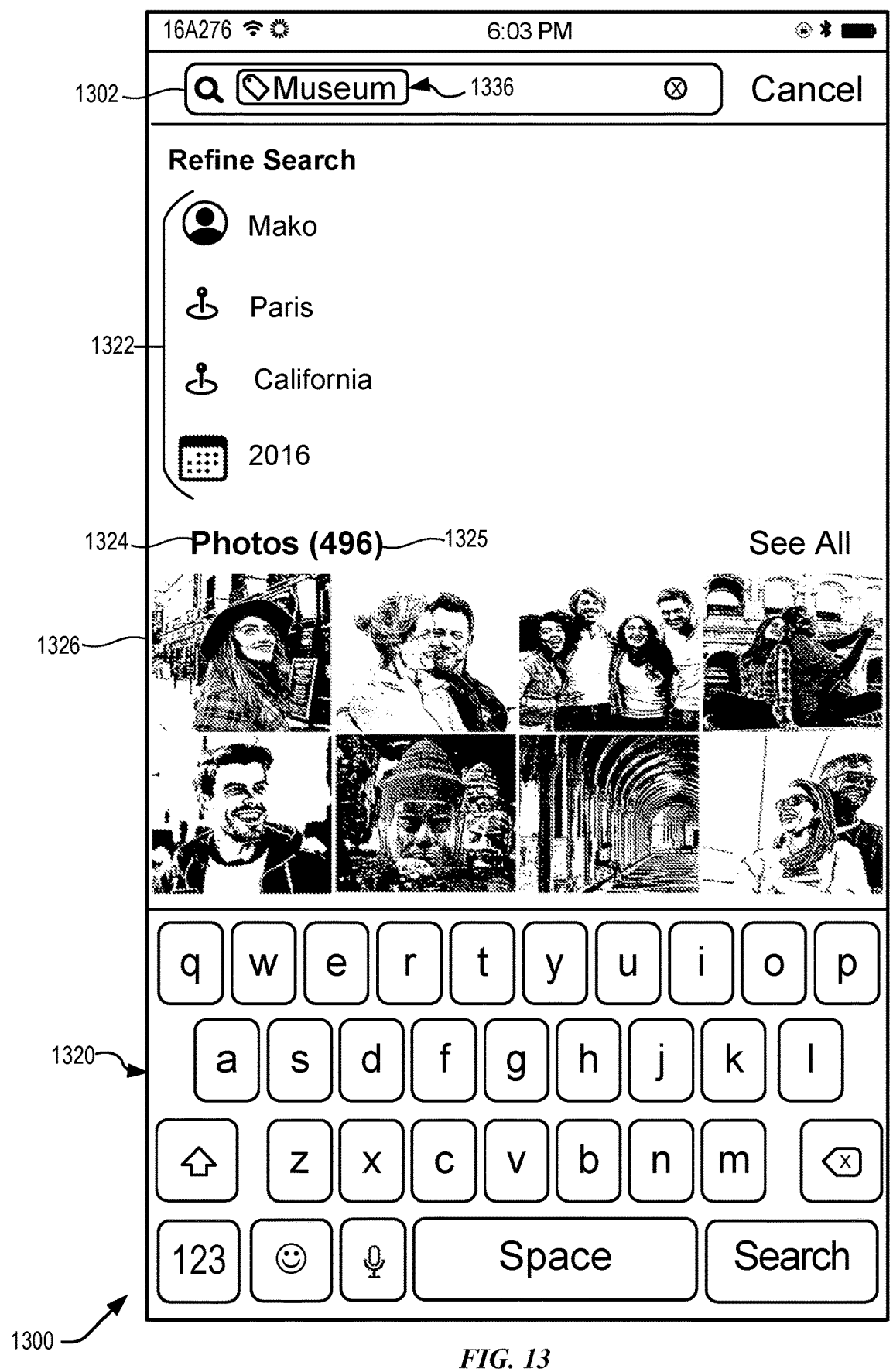
FIG. 13 illustrates another example user interface for digital asset search, specifically an example of keyword suggestion, in accordance with at least one embodiment.

FIG. 13 illustrates another example user interface for digital asset search, specifically an example of keyword suggestion, in accordance with at least one embodiment. The user interface 900 allows a user to further refine a search of the digital asset collection. Similar to user interface 300-1100, a search field 1302 is depicted in one area of the display. Upon selection of one of the search suggestions 1322 the digital asset management module/logic presents one or more additional search suggestions 1322. By way of example in FIG. 13, the "Museum" search selection 1336 is selected and is displayed in the search field 1302. The Refine Search suggestions 1322 include a Person ("Mako"), a Place ("Paris"), a Place ("California"), and a year ("2016"). By way of example, in FIG. 13, the Photos identifier 1324 lists the type of digital assets with metadata associated with the search term selection 1336. The asset quantity number 1325 indicates the number of digital assets for the Photo identifier 1324. In the example in FIG. 13, there are 496 photos responsive to the "Museum" search selection 1336. FIG. 13 presents the Top 8 digital assets 1326 of responsive to the selected search criteria 1336. In some embodiment, the virtual keyboard 1320 can be entered by selecting the search field 1302.

Figure 14:
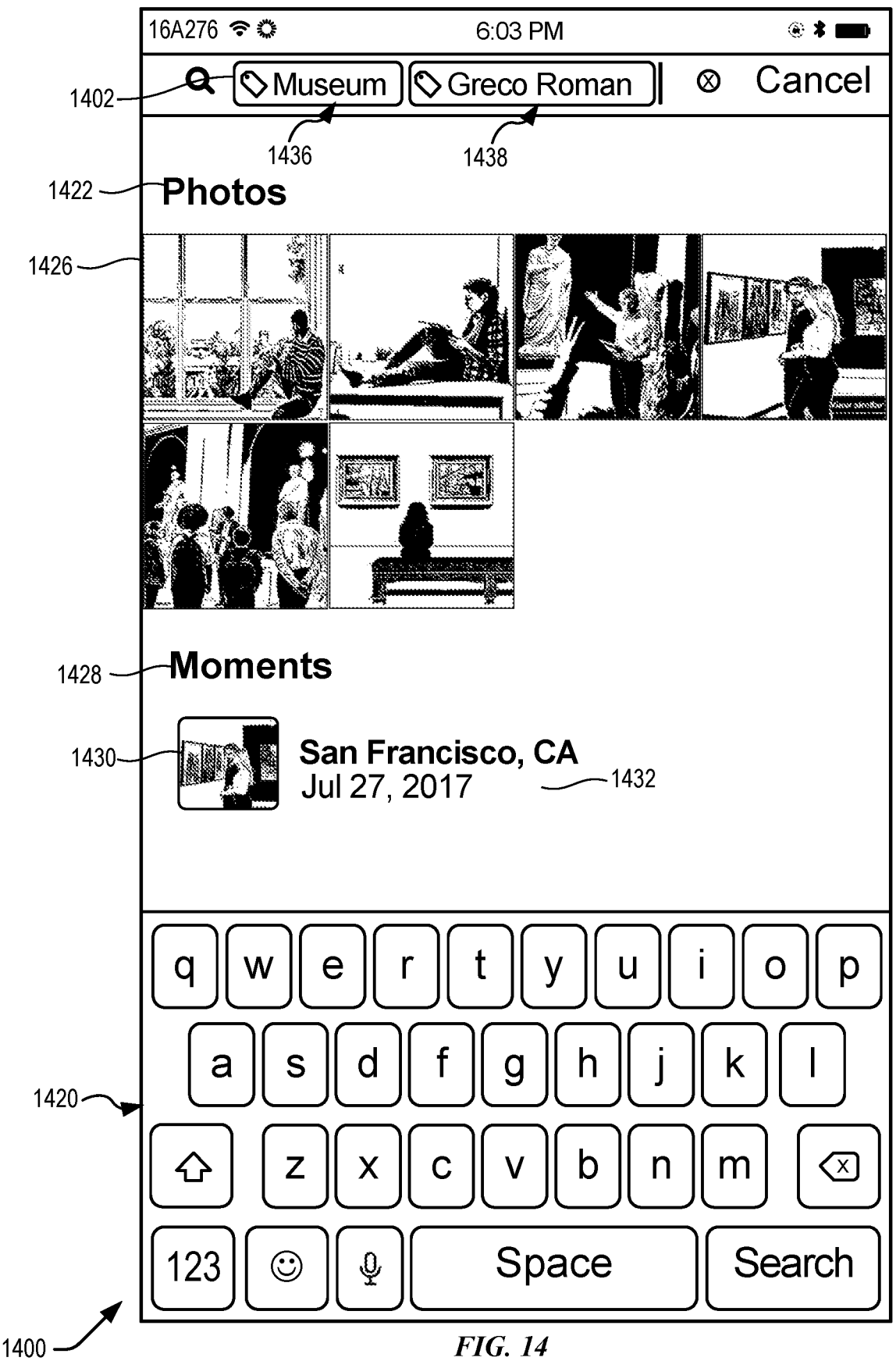
FIG. 14 illustrates another example user interface for digital asset search, specifically a results page, in accordance with at least one embodiment.

FIG. 14 illustrates another example user interface for digital asset search, specifically a results page, in accordance with at least one embodiment. The user interface 1400 displays results for the selected "Museum" primary search criteria 1436 and "Greco Roman" selected secondary search criteria 1438. Similar to user interface 300-1300, a search field 1402 is depicted in one area of the display. By way of example, in FIG. 14, the Photos identifier 1424 lists the type of digital assets with metadata associated with the primary search selection 1436 and the secondary search selection 1438. By way of example, in FIG. 14, the Photos identifier 1424 lists the type of digital assets with metadata associated with the primary search term selection 1436 and the secondary search term 1438. The user interface 1400 displays six digital assets. In addition, FIG. 14 also depicts a Moments indicator 1428. A moment multimedia content icon 1430 is depicted. Each moment multimedia content icon 1430 depicts a representative image from the digital assets associated with the moment and a keyword tag 1432 identifier that identifies a location and date associated with the digital assets associated with the moment. Selection of any one of these moment multimedia content icons 1430 would further limit the search of the digital asset collection and return only digital assets that relate to both the location and temporal limitation associated with the moment. In FIG. 14, the exemplary moment is "San Francisco, Calif." from a concert from "Jul. 27, 2017." In some embodiment, the virtual keyboard 1420 can be entered by selecting the search field 1402.

Figure 15A:
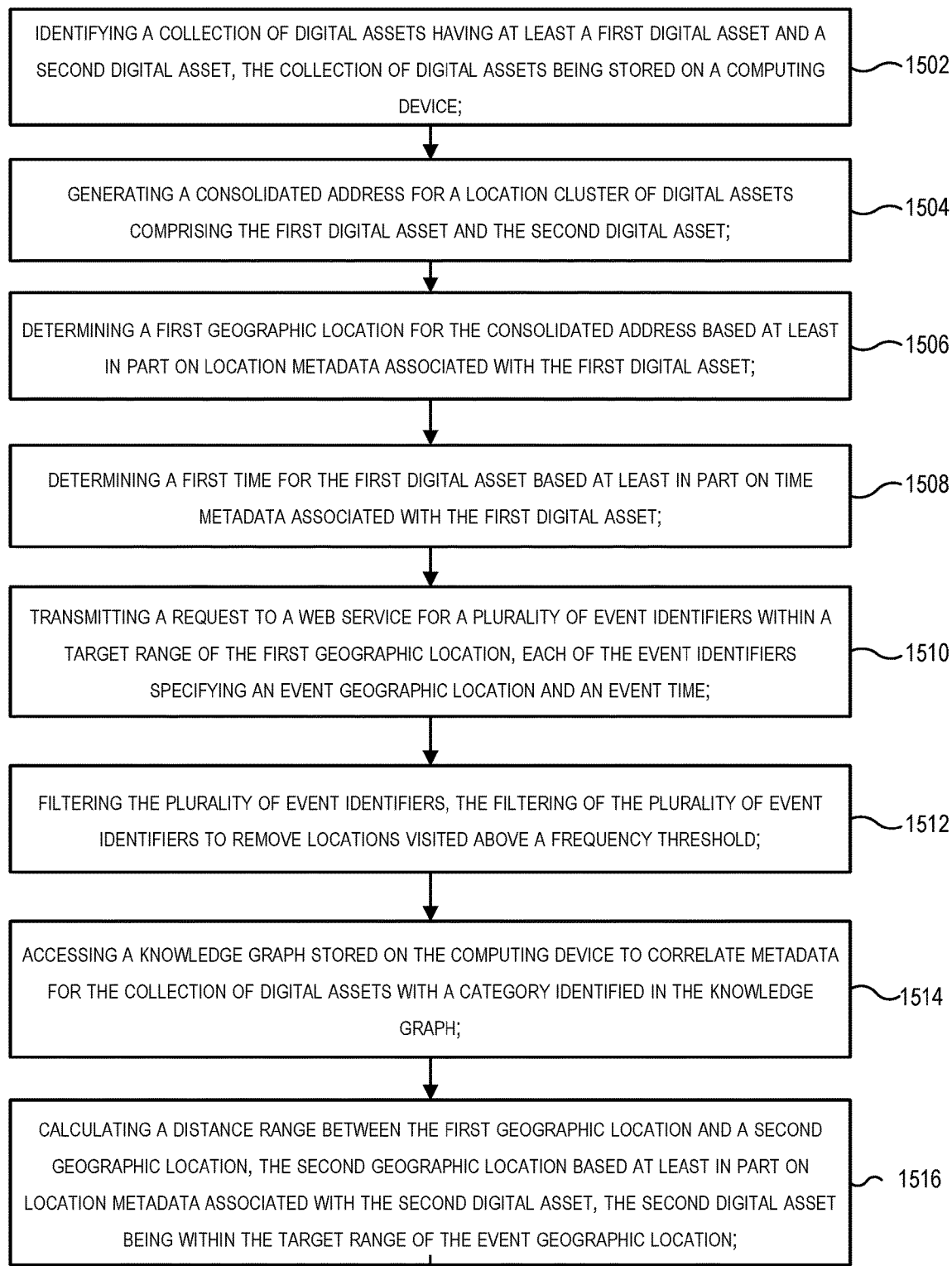
FIG. 15A and FIG. 15B illustrate a flow diagram to illustrate techniques for disambiguation of occurrence identifiers as described herein, according to at least one example.
Figure 15B:
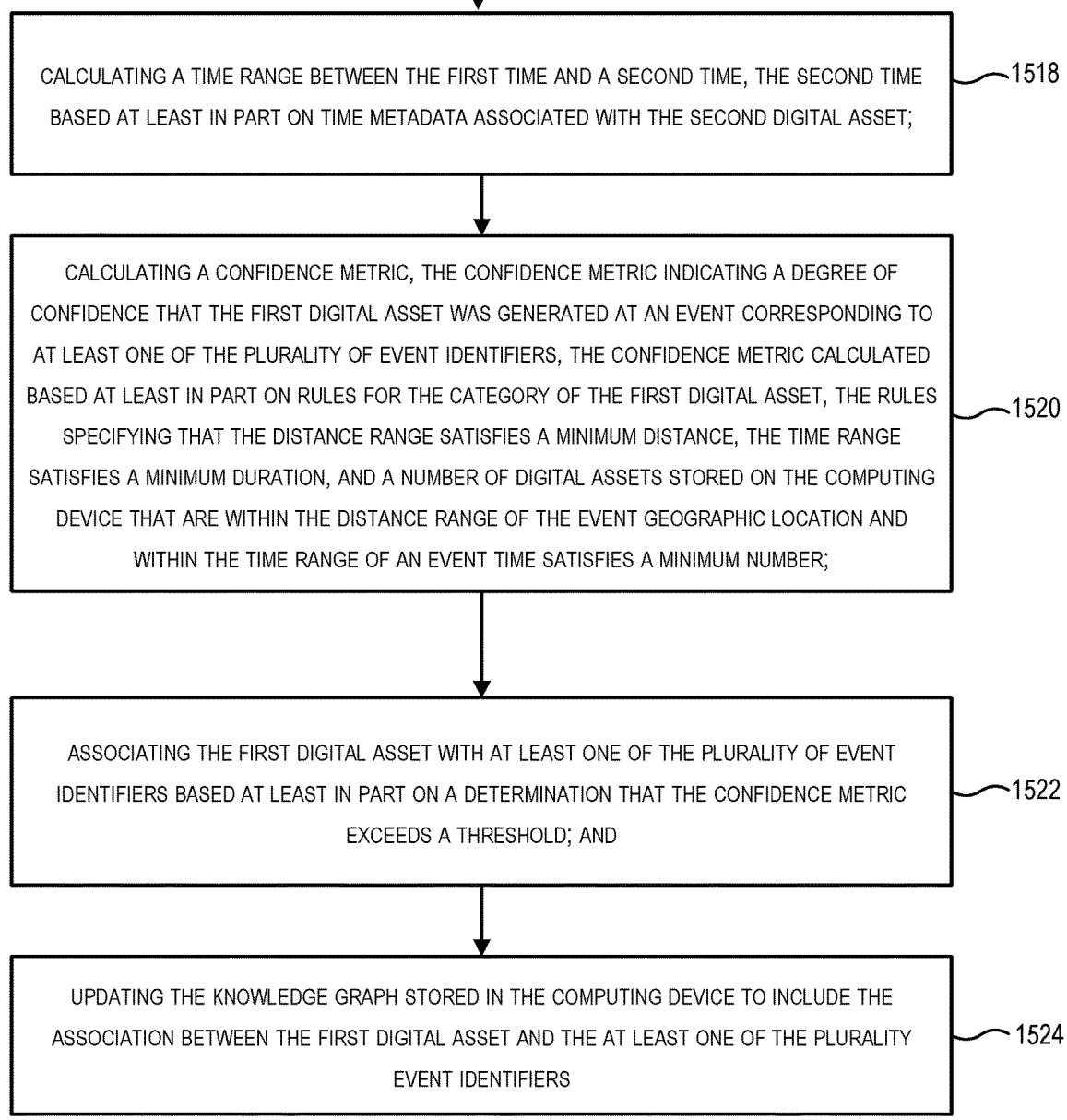

FIG. 15A and FIG. 15B illustrate a flow diagram 1500 to illustrate techniques for disambiguation of occurrence identifiers as described herein, according to at least one example.

At 1502, the technique comprises identifying a collection of digital assets having at least a first digital asset and a second digital asset, the collection of digital assets being stored on a computing device. The collection of digital assets can be digital photos, videos, live photos, screen captures, etc. The digital assets can be stored in a memory of a computing device. The techniques include using the properties of clusters of digital assets to be able to disambiguate the event in which the digital asset was captured.

At 1504, the technique comprises generating a consolidated address for a location cluster of digital assets comprising the first digital asset and the second digital asset. In some embodiments, a consolidated address is determined by clustering the locations of the locations of digital assets using a weighted centroid. A consolidated address is a construct built on top of address edges and node in the knowledge graph. A consolidated address combines several address edges that point to the same place mark with a maximum time and distance location. Using consolidated address helps extend attendance time for users visiting large venues.

At 1506, the technique comprises determining a first geographic location for the consolidated address based at least in part on location metadata associated with the first digital asset. Each digital asset has a plurality of associated metadata stored in the memory of the computing device. The metadata includes location metadata that can be determined by capturing the device's location via GPS, or Wi-Fi signal, or a plurality of other methods for calculating the geographic location of a computing device or digital camera capturing the digital asset. Services are available that track the current location of the computing device. The location of the computing device can be saved overtime. The service can use GPS, Wi-Fi, cellular tower signals, or electronic payment methods to determine an accurate position of the computing device over time. The location information can be accessed by the disambiguation techniques to increase the confidence level of the event location.

At 1508, the technique comprises determining a first time for the first digital asset based at least in part on time metadata associated with the first digital asset. The time metadata can be captured from a clock incorporated in the computing device. In some embodiments, the time can be stored in Universal Time Coordinates (UTC).

At 1510, the technique comprises transmitting a request to a web service for a plurality of event identifiers within a target range of the first geographic location, each of the event identifiers specifying an event geographic location and an event time. In some embodiments, a web service can store a plurality of information for public and private events. The web service can maintain a plurality of information concerning the events including but not limited to the starting time, starting date ending time, ending date, duration, geographic position, categorization of event, event performers, locales associated with the event. In some embodiments, the technique includes requesting a plurality of information within a target range of the first geographic location. In some embodiments, the target range can be 1500 meters. However, if an excessive number of event identifiers are returned from the query the target range can be reduced. Alternatively, if no event identifiers are returned from the query the target range can be increased. In some embodiments, the request can be made over a network such as the internet. In some embodiments, the event identifiers can be cached locally on the computing device.

At 1512, the technique comprises filtering the plurality of event identifiers, the filtering of the plurality of event identifiers to remove locations visited above a frequency threshold. For example, some locations such as a user's home, work, or other frequent geographic area can be removed from the possible event identifiers. For example, a user may have two homes and the second home can be considered a frequent location. In some embodiments, the technique filters out addresses that are at a user's home, work or are within 200 meters from a frequently visited location. The technique will establish a frequency threshold and use this threshold to determine what locations are frequently visited by a user. A frequent location represents a place the user visits very often. The knowledge graph used this in the past to infer trips for instance. Public Events disambiguation also uses this to its advantage to not allow events at a frequent location in order to improve precision. This however can require special adjustment as the public events that should be detected when the user frequently visits one particular venue, e.g., an opera enthusiast. Location and identification precision can be achieved by applying statistical methods on the frequent locations of the knowledge graph to only filter out consolidated addresses that are close to the most important frequent locations.

At 1514, the technique comprises accessing a knowledge graph stored on the computing device to correlate metadata for the collection of digital assets with a category identified in the knowledge graph. Using the techniques stated above for calculated the geographic location and time for a digital asset, the knowledge graph can be accessed to determine if there is any additional metadata available to help disambiguate the event identifier where the digital asset was captured. In some embodiments, the categories for the digital asset can include sporting event, music concert, night life, festival and fair, theater, dance, and museums. Each category can provide for multiple techniques for disambiguation depending on the category.

At 1516, the technique comprises calculating a distance range between the first geographic location and a second geographic location, the second geographic location based at least in part on location metadata associated with the second digital asset, the second digital asset being within a target range of the event geographic location. The system calculates that there are two digital assets captured within a target range from each other, the system can calculate the distance range that can be used to determine based at least in part on the distance range between the first geographic location, where the first digital asset was captured, and a second geographic location, where a second digital asset was captured. In some embodiments, the distance range should be a maximum of 500 meters. In some embodiments, the distance range can be varied depending on the category for the digital asset and the density of other events and POIs in that area. For example, some types of public events such as large music festivals can occur over a dispersed geographic area. In some embodiments, the public event can occur at multiple, different, distinct buildings.

At 1518, as shown in FIG. 15B, the technique comprises calculating a time range between the first time and a second time, the second time based at least in part on time metadata associated with the second digital asset. The time range can be used as a measure to determine how long a user was at a public event. In some embodiments, the time range can be extended either before or after event duration to capture digital assets taken before or after the event. The time range can be measured in hours, minutes, and seconds. In some embodiments, the time range may comprise only minutes or seconds.

At 1520, the technique comprises calculating a confidence metric, the confidence metric indicating a degree of confidence that the first digital asset was generated at an event corresponding to at least one of the plurality of event identifiers. In some embodiments, the confidence metric indicates a degree of confidence that the digital assets for a consolidated address were generated at an event. The confidence metric can be calculated based at least in part on rules for the category of the first digital asset. The rules specify that in order for a digital asset or collection to be associated with an event occurrence the distance range satisfies a minimum distance, the time range satisfies a minimum duration, and a number of digital assets stored on the computing device that are within the distance range of the event geographic location and within the time range of an event time satisfies a minimum number. The rules can be different for each one of the categories. For example one sporting event criteria can require a minimum of 20 minutes attendance with a maximum distance of 500 meters and a minimum of two digital assets captured at the event with high precision scene classification. In some embodiments, another criteria requires only five minutes of attendance and 750 m maximum distance while requiring seven digital assets be captured matching high precision scenes related to the sporting event. The disambiguation criteria utilize meaningful event inference which allows building specific criteria for scene classifications, people, part of the day, location, social groups, date, point of interest, and predominant motion. In some embodiments, the system defines high confidence criteria as well as prohibited criteria, that if matched prohibit inferring the event category for that consolidated address. This allows for high flexibility when applying supervised machine learning techniques. The consolidated address will be abstracted with its moment into the PGPublicEventMatchingOptions.

Each category defines multiple criteria that affect the confidence metric positively or negatively. By way of non-limiting examples, the criteria can include: minimum time attendance, maximum distance; minimum attendance; allowing expanding time attendance; disambiguation criteria; high confidence criteria; and prohibited criteria. The minimum time attendance criteria is the minimum time the user must have attended the event. The maximum distance criteria is the maximum allowed distance from the locations of the consolidated address to the event locations. If one consolidated address location is closer than maximum distance, it affects confidence positively. Otherwise if no location of consolidated addresses is closer than the maximum distance, the confidence is affected negatively. By allow expanding time attendance the technique expands time attendance date interval when trying to find intersections between consolidated address date interval and event date interval. The minimum attendance criteria, if set, requires a certain given minimum event attendance to positively or negatively affect the confidence metric. The disambiguation criteria: if set, requires additional knowledge graph features (scene, part of day, people, place, etc.) to match the metadata of the digital criteria in order for the event to be inferred using one of the aforementioned techniques. The high confidence criteria: if set, uses additional knowledge graph features (scene, part of day, people, place, etc.) to match the event with high confidence. These criteria are not mandatory for an event to be inferred but will increase the confidence metric. The prohibited criteria: if set, uses additional knowledge graph features (scene, part of day, people, place, etc.) to match the event with prohibited criteria. A positive match is a strong negative signal.

The actual attendance date interval is built by using the consolidated addresses start and end time and expand it with the core routine visit happening at the same time and location. Note, for core routine visit to be used for expanding the time location cluster, photos graph must have previously use the LOI visit from core routine for improving the location of the photos. This can be verified under routine disambiguation. Abstracting those basic graph concepts allows to match different kinds of non-photos events with the public event data. Matching one criteria with one option object is invoked during the matching process. The matching process compares the matching options with the criteria. The time matching is implemented in a way that allows fuzziness to deal with incorrect vendor data as well as circumstances when users are only taking pictures before or after the event. Event times are compared with the extended data date interval from the matching options for any intersection if they intersect, the actual tenants duration for the matching options will be used for further validation. Once an event has been disambiguated it's maximum distance is collected for that consolidated address. If multiple events have been inferred for one address, statistical methods are used to finally disambiguate only the closest ones that match with high confidence. In some embodiments, a public event must have an expected attendance of at least 10,000 seats or the business item connected to the public event must have a capacity of at least 10,000 guests. Only one public event must be connected to the memory. The business item connected to the public event must have core routine information with high confidence. High confidence is defined as having a value greater or equal to 0.6 or 60% confident.

For a concert category, the rules can specify some of the different type of attributes for the concert for event disambiguation. For example, the minimum attendance time may be two hours and the maximum range may be 300 meters from the center of the event. In some embodiments, larger events have less strict criteria. In some embodiments, the data may be too large and would capture too many digital assets.

At 1522, the technique comprises associating the first digital asset with at least one of the plurality of event identifiers based at least in part on a determination that the confidence metric exceeds a threshold. In some embodiments, the threshold can change depending on the category of the event.

At 152, the technique comprises updating the knowledge graph stored in the computing device to include the association between the first digital asset and the at least one of the plurality event identifiers.

Figure 16A:
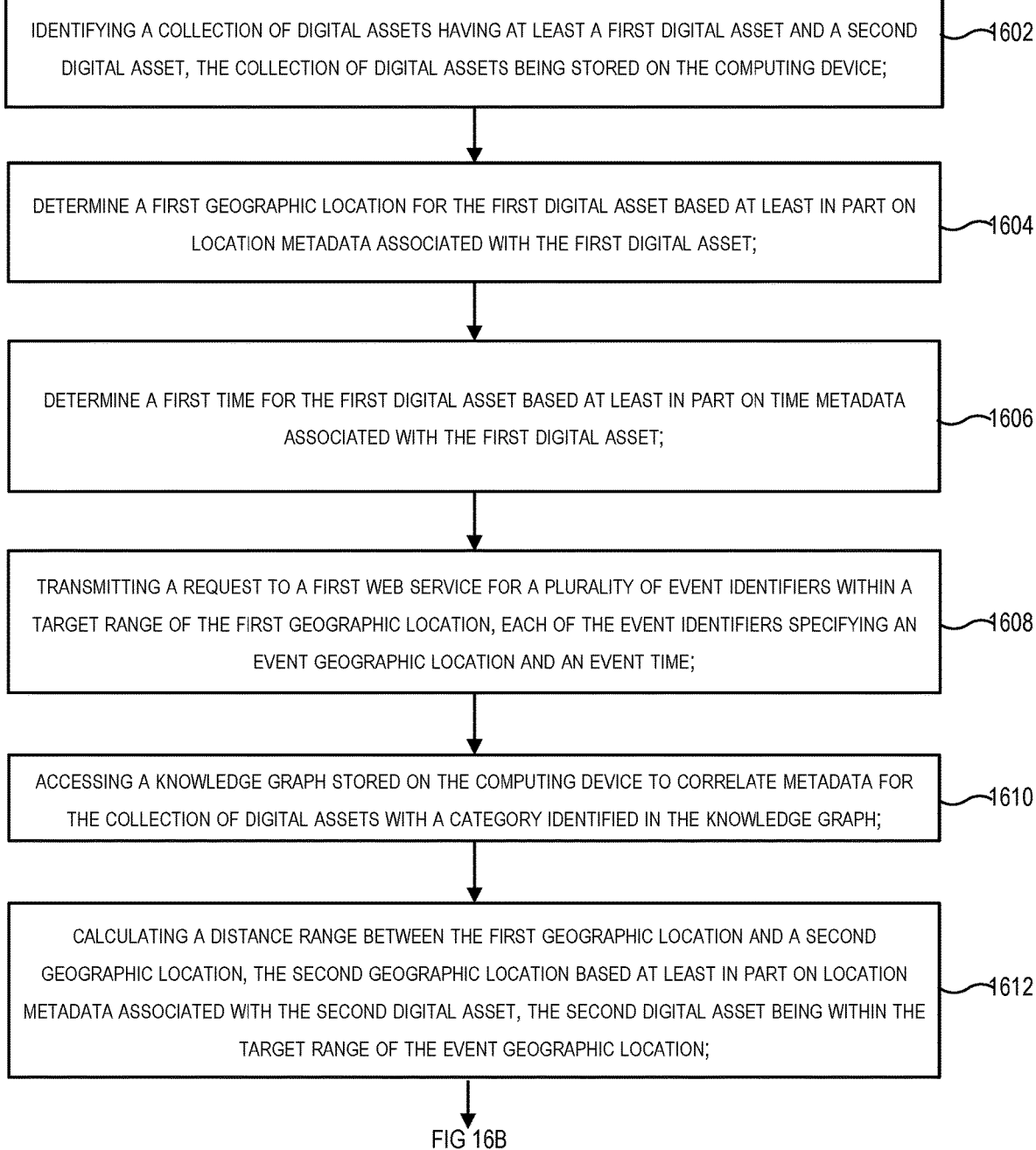
FIG. 16A and FIG. 16B illustrate a flow diagram to illustrate computer readable medium techniques for disambiguation of occurrence identifiers as described herein, according to at least one example.
Figure 16B:
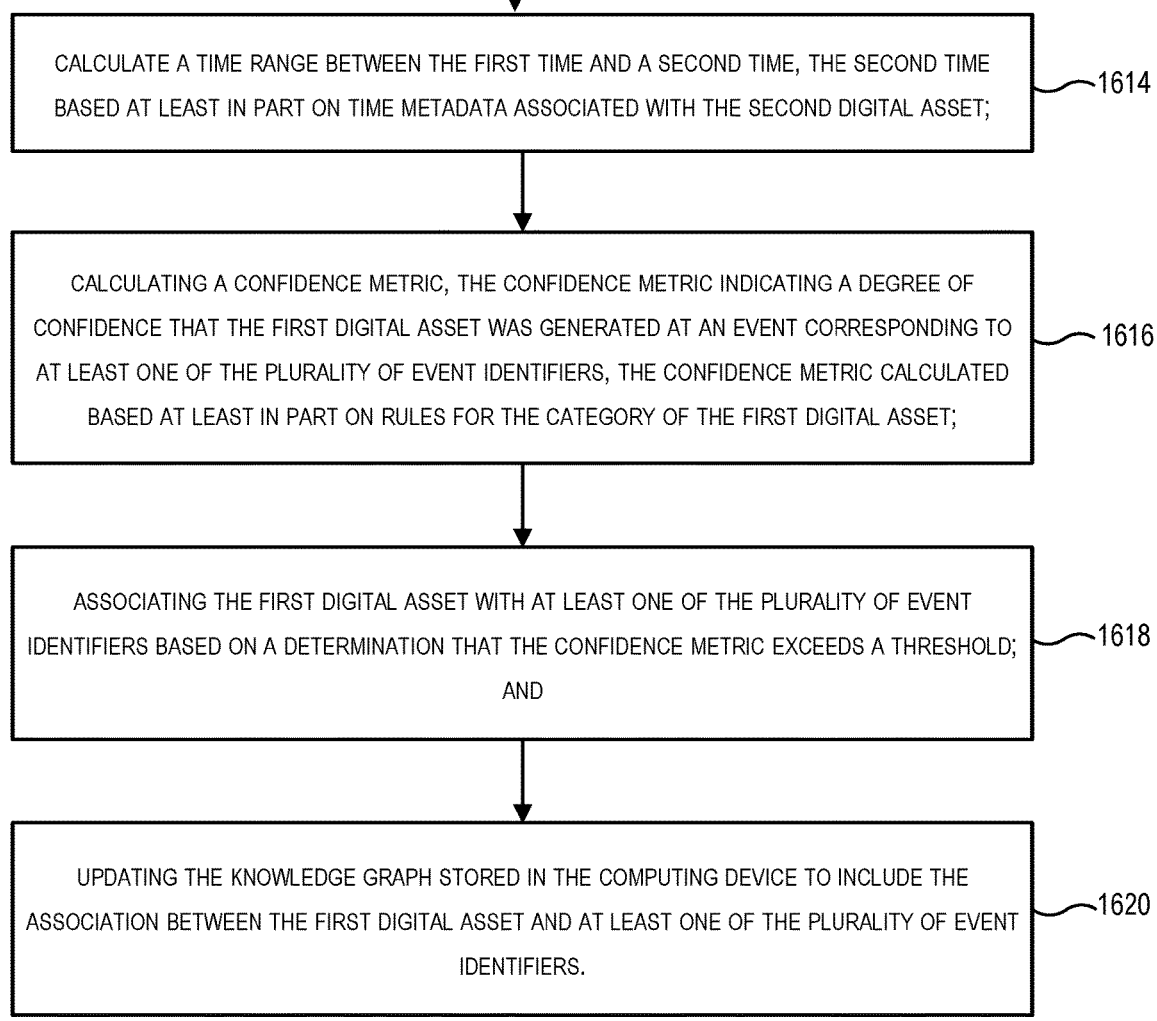

FIG. 16A and FIG. 16B illustrate a flow diagram 1600 to illustrate computer readable medium techniques for disambiguation of occurrence identifiers as described herein, according to at least one example. The computer readable medium can store a plurality of instructions that, when executed by one or more processors of a computing device, cause the one or more processors to perform various operations.

At 1602, the operations comprise identifying a collection of digital assets having at least a first digital asset and a second digital asset, the collection of digital assets being stored on the computing device. The collection of digital assets can be digital photos, videos, live photos, screen captures, etc. The digital assets can be stored in a memory of a computing device. The techniques include using the properties of clusters of digital assets to be able to disambiguate the event in which the digital asset was captured.

At 1604, the operations comprise determine a first geographic location for the first digital asset based at least in part on location metadata associated with the first digital asset. Each digital asset has a plurality of associated metadata stored in the memory of the computing device. The metadata includes location metadata that can be determined by capturing the device's location via GPS, or Wi-Fi signal, or a plurality of other methods for calculating the geographic location of a computing device or digital camera capturing the digital asset.

At 1606, the operations comprise determine a first time for the first digital asset based at least in part on time metadata associated with the first digital asset. The time metadata can be captured from a clock incorporated in the computing device. In some embodiments, the time can be stored in Universal Time Coordinates (UTC).

At 1608, the operations comprise transmitting a request to a first web service for a plurality of event identifiers within a target range of the first geographic location, each of the event identifiers specifying an event geographic location and an event time. In some embodiments, a web service can store a plurality of information for public and private events. The web service can maintain a plurality of information concerning the events including but not limited to the starting time, starting date ending time, ending date, duration, geographic position, categorization of event, event performers, locales associated with the event. In some embodiments, the technique includes requesting a plurality of information within a target range of the first geographic location. In some embodiments, the target range can be 1500 meters. However, if an excessive number of event identifiers are returned from the query the target range can be reduced.

At 1610, the operations comprise accessing a knowledge graph stored on the computing device to correlate metadata for the collection of digital assets with a category identified in the knowledge graph. In some embodiments, the technique filters out addresses that are at a user's home, work or are within 200 meters from a frequently visited location. The technique will established a frequency threshold and use this threshold to determine what locations are frequently visited by a user. A frequent location represents a place the user visits very often. The knowledge used this in the past to infer trips for instance. Public Events disambiguation also uses this to its advantage to not allow events at a frequent location in order to improve precision. This however can require special adjustment as the public events that should be detected when the user frequently visits one particular venue, e.g., an opera enthusiast. Location and identification precision can be achieved by applying statistical methods on the frequent locations of the knowledge graph to only filter out consolidated addresses that are close to the most important frequent locations.

At 1612, the operations comprise calculating a distance range between the first geographic location and a second geographic location, the second geographic location based at least in part on location metadata associated with the second digital asset, the second digital asset being within a target range of the event geographic location. Using the techniques stated above for calculated the geographic location and time for a digital asset, the knowledge graph can be accessed to determine if there is any additional metadata available to help disambiguate the event identifier where the digital asset was captured. In some embodiments, the categories for the digital asset can include sporting event, music concert, night life, festival and fair, theater, dance, and museums. Each category can provide for multiple techniques for disambiguation depending on the category.

At 1614, the operations comprise calculate a time range between the first time and a second time, the second time based at least in part on time metadata associated with the second digital asset. The system calculates that there are two digital assets captured within a target range from each other, the system can calculate the distance range that can be used to determine based at least in part on the distance range between the first geographic location, where the first digital asset was captured, and a second geographic location, where a second digital asset was captured. In some embodiments, the distance range should be a maximum of 500 meters. In some embodiments, the distance range can be varied depending on the category for the digital asset. For example, some types of public events such as large music festivals can occur over a dispersed geographic area. In some embodiments, the public event can occur at multiple, different, distinct buildings.

At 1616, the operations comprise calculating a confidence metric, the confidence metric indicating a degree of confidence that the first digital asset was generated at an event corresponding to at least one of the plurality of event identifiers, the confidence metric calculated based at least in part on rules for the category of the first digital asset. The time range can be used as a measure to determine how long a user was at a public event. In some embodiments, the time range can be extended either before or after event duration to capture digital assets taken before or after the event. The time range can be measured in hours, minutes, and seconds. In some embodiments, the time range may comprise only minutes or seconds.

At 1618, the operations comprise associating the first digital asset with at least one of the plurality of event identifiers based on a determination that the confidence metric exceeds a threshold. The confidence metric can be calculated based at least in part on rules for the category of the first digital asset. The rules specify that in order for a digital asset or collection to be associated with an event occurrence the distance range satisfies a minimum distance, the time range satisfies a minimum duration, and a number of digital assets stored on the computing device that are within the distance range of the event geographic location and within the time range of an event time satisfies a minimum number. The rules can be different for each one of the categories. For example one sporting event criteria can require a minimum of 20 minutes attendance with a maximum distance of 500 m and a minimum of two digital assets captured at the event with high precision scene classification. In some embodiments, another criteria requires only five minutes of attendance and 750 m maximum distance while requiring seven digital assets be captured matching high precision scenes related to the sporting event. The disambiguation criteria that utilize meaningful event inference which allows buildings specific criteria for scene classifications, people, part of the day, location, social groups, date, point of interest, and predominant motion. In some embodiments, the system defies high confidence criteria as well as prohibited criteria, that if matched prohibit inferring the event category for that consolidated address. This allows for high flexibility when applying supervised machine learning techniques. The consolidated address will be abstracted with its moment into the PGPublicEventMatchingOptions.

The actual attendance date interval is built by using the consolidated addresses start and end time and expand it with the core routine visit happening at the same time and location. Note, for core routine visit to be used for expanding the time location cluster, photos graph must have previously use the LOI visit from core routine for improving the location of the photos. This can be verified under routine disambiguation. Abstracting those basic graph concepts allows to match different kinds of non-photos events with the public event data. Matching one criteria with one option object is invoked during the matching process. The matching process compares the matching options with the criteria. The time matching is implemented in a way that allows fuzziness to deal with incorrect vendor data as well at is when users are only taking pictures before or after the event. Event times are compared with the extended data date interval from the matching options for any intersection if they intersect, the actual tenants duration for the matching options will be used for further validation. Once an event has business been distant big you'd its maximum distance is collected for that consolidated address. If multiple events have been inferred for one address, statistical methods are used to finally disambiguate only the closest ones that match with high confidence. In some embodiments, a public event must have an expected attendance of at least 10,000 seats or the business item connected to the public event must have a capacity of at least 10,000 guests. Only one public event must be connected to the memory. The business item connected to the public event must have core routine information with high confidence. High confidence is defined as having a value greater or equal to 0.6 or 60% confident.

At 1620, the operations comprise updating the knowledge graph stored in the computing device to include the association between the first digital asset and at least one of the plurality of event identifiers.

Figure 17:
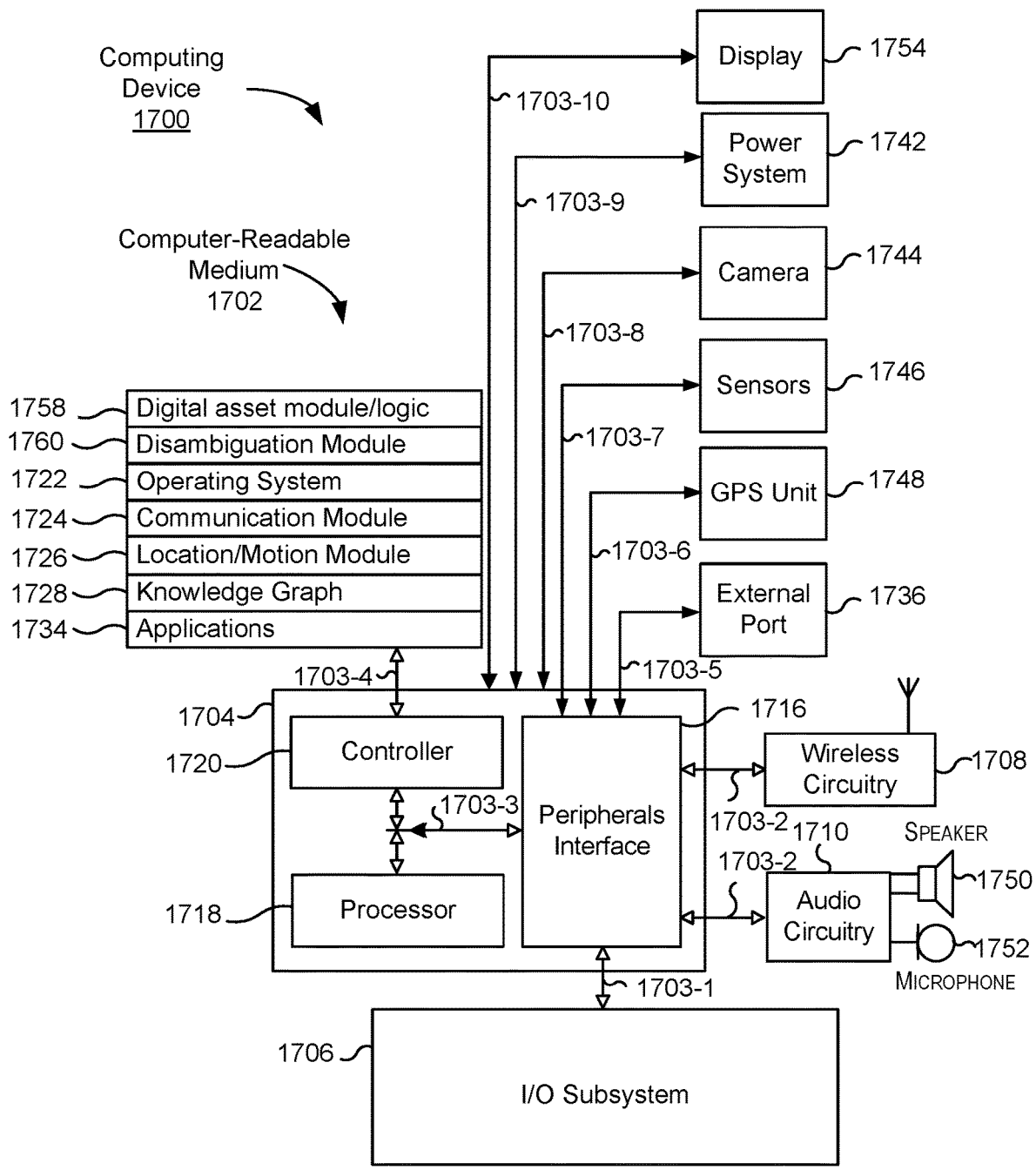
FIG. 17 illustrates an exemplary diagram of a computer device architecture.

FIG. 17 is a block diagram of an example device 1700, which can be a mobile device that can be used to perform the disambiguation techniques described herein. Device 1700 generally includes computer-readable medium (memory) 1702, a processing system 1704, an Input/Output (I/O) subsystem 1706, wireless circuitry 1708, and audio circuitry 1710 including speaker 1750 and microphone 1752. These components may be coupled by one or more communication buses or signal lines 1703. Device 1700 can be any portable electronic device, including a handheld computer, a tablet computer, a mobile phone, laptop computer, tablet device, media player, a wearable device, personal digital assistant (PDA), a multi-function device, a mobile phone, a portable gaming device, a car display unit, or the like, including a combination of two or more of these items.

The device 1700 can be a multifunction device having a touch screen in accordance with some embodiments. The touch screen optionally displays one or more graphics within a user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 1700. In some implementations or circumstances, inadvertent contact with a graphic does not select the graphic. For example, a swipe gesture that sweeps over an application icon optionally does not select the corresponding application when the gesture corresponding to selection is a tap. Device 1700 can optionally also include one or more physical buttons, such as "home" or a menu button. As the menu button is, optionally, used to navigate to any application in a set of applications that are, optionally, executed on the device 1700. Alternatively, in some embodiments, the menu button is implemented as a soft key in a graphical user interface displayed on touch screen.

The device 1700 can incorporate a display 1754. The display 1754 can be a LCD, OLED, AMOLED, Super AMOLED, TFT, IPS, or TFT-LCD that typically can be found a computing device. The display 1754 can incorporate a touchscreen display.

In one embodiment, device 1700 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1700 also accepts verbal input for activation or deactivation of some functions through microphone. Device 1700 also, optionally, includes one or more contact intensity sensors for detecting intensity of contacts on touch screen and/or one or more tactile output generators for generating tactile outputs for a user of device 1700.

In one illustrative configuration, device 1700 may include at least one computer-readable medium (memory) 1702 and one or more processing units (or processor(s)) 1718. Processor(s) 1718 may be implemented as appropriate in hardware, software, or combinations thereof. Computer-executable instruction or firmware implementations of processor(s) 1718 may include computer-executable instructions written in any suitable programming language to perform the various functions described.

Computer-readable medium (memory) 1702 may store program instructions that are loadable and executable on processor(s) 1718, as well as data generated during the execution of these programs. Depending on the configuration and type of device 1700, a computer-readable medium 1702 or memory may be volatile (such as random access memory (RAM)) and/or non-volatile (such as read-only memory (ROM), flash memory, etc.). Device 1700 can have one or more memories. Device 1700 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, a computer-readable medium 1702 or memory may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The computer-readable medium 1702 or memory and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. A computer-readable medium 1702 or memory and additional storage are both examples of non-transitory computer storage media. Additional types of computer storage media that may be present in device 1700 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 1700. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Device 1700 may also contain wireless circuitry 1708 or communications connection(s) that allow device 1700 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 1700 may also include I/O device(s) 1706, such as a touch input device, a keyboard, a mouse, a pen, a voice input device, a display, a speaker, a printer, etc.

It should be apparent that the architecture shown in FIG. 17 is only one example of an architecture for device 1700, and that device 1700 can have more or fewer components than shown, or a different configuration of components. The various components shown in FIG. 17 can be implemented in hardware, software, or a combination of both hardware and software, including one or more signal processing and/or application specific integrated circuits.

Wireless circuitry 1708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1708 can use various protocols, e.g., as described herein. For example, wireless circuitry 1708 can have one component for one wireless protocol (e.g., Bluetooth®) and a separate component for another wireless protocol (e.g., UWB). Different antennas can be used for the different protocols.

Wireless circuitry 1708 is coupled to processing system 1704 via peripherals interface 1716. Peripherals interface 1716 can include conventional components for establishing and maintaining communication between peripherals and processing system 1704. Voice and data information received by wireless circuitry 1708 (e.g., in speech recognition or voice command applications) is sent to one or more processors 1718 via peripherals interface 1716. One or more processors 1718 are configurable to process various data formats for one or more application programs 1734 stored on computer-readable medium (memory) 1702.

Peripherals interface 1716 couple the input and output peripherals of the device to processor(s) 1718 and computer-readable medium 1702. One or more processors 1718 communicate with computer-readable medium 1702 via a controller 1720. Computer-readable medium 1702 can be any device or medium that can store code and/or data for use by one or more processors 1718. Computer-readable medium 1702 can include a memory hierarchy, including cache, main memory and secondary memory.

Device 1700 also includes a power system 1742 for powering the various hardware components. Power system 1742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1700 includes a camera 1744. In some embodiments, device 1700 includes sensors 1746. Sensors 1746 can include accelerometers, compasses, gyrometers, pressure sensors, audio sensors, light sensors, barometers, and the like. Sensors 1746 can be used to sense location aspects, such as auditory or light signatures of a location.

In some embodiments, device 1700 can include a GPS receiver, sometimes referred to as a GPS unit 1748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1718 run various software components stored in the computer-readable medium 1702 to perform various functions for device 1700. In some embodiments, the software components include an operating system 1722, a communication module 1724 (or set of instructions), a location module 1726 (or set of instructions), a knowledge graph 1728 that is used as part of ranging operation described herein, and other applications 1734 (or set of instructions).

Operating system 1722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 1722 is system software that manages computer hardware and software resources and provides common services for computer programs. For example, the operating system 1722 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 1724 facilitates communication with other devices over one or more external ports 1736 or via wireless circuitry 1708 and includes various software components for handling data received from wireless circuitry 1708 and/or external port 1736. External port 1736 (e.g., USB, FireWire, Lightning connector, 60-pin connector, etc.) is adapted for coupling directly to other devices or indirectly over a network (e.g., the Internet, wireless LAN, etc.).

Location/motion module 1726 can assist in determining the current position (e.g., coordinates or other geographic location identifiers) and motion of device 1700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1726 receives data from GPS unit 1748 and analyzes the signals to determine the current position of the mobile device. In some embodiments, location/motion module 1726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1708 and is passed to location/motion module 1726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1700 based on the position coordinates of the corresponding transmitters. Regardless of the specific location technology used, location/motion module 1726 receives information from which a location fix can be derived, interprets that information, and returns location information, such as geographic coordinates, latitude/longitude, or other location fix data.

In some embodiments, a digital asset management module/logic obtains or generates a knowledge graph 1728 metadata network (hereinafter "knowledge graph") associated with a collection of digital assets. The metadata network can comprise of correlated metadata assets describing characteristics associated with digital assets in the digital asset collection. Each metadata asset can describe a characteristic associated with one or more digital assets in the digital asset collection. In a non-limiting example, a metadata asset can describe a characteristic associated with multiple digital assets in the digital asset collection. Each metadata asset can be represented as a node in the metadata network. A metadata asset can be correlated with at least one other metadata asset. Each correlation between metadata assets can be represented as an edge in the metadata network that is between the nodes representing the correlated metadata assets. In some embodiments, the digital asset management module/logic identifies a first metadata asset in the metadata network. The digital asset management module/logic can also identify a second metadata asset based on at least the first metadata asset. In some embodiments, the digital asset management module/logic causes one or more digital assets with the first and/or second metadata assets to be presented via an output device.

In some embodiments, the digital asset management module/logic 1758 can enable the system to generate and use and knowledge graph 1728 of the digital asset metadata as a multidimensional network. The digital asset management module/logic 1758 can obtain or receive a collection of digital asset metadata associated with the digital asset collection. The digital assets stored in the digital asset collection includes, but is not limited to, the following: image media (e.g., still or animated image, etc.); audio media (e.g., a digital sound file); text media (e.g., an e-book, etc.); video media (e.g., a movie, etc.); and haptic media (e.g., vibrations or motions provided in connection with other media, etc.). The examples of digitized data above can be combined to form multimedia (e.g., an animated movie, a videogame etc.). A single digital asset refers to a single instance of digitized data (e.g., an image, a song, a movie, etc.).

The disambiguation module 1760 comprises instructions in the computer-readable medium 1702 or memory of the computing device 1700 that performs the one or more techniques for disambiguation location identifiers.

The one or more applications programs 1734 on the mobile device can include any applications installed on the device 1700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1706 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1706 can include a display and user input devices such as a keyboard, mouse, and/or track pad. In some embodiments, I/O subsystem 1706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the computer-readable medium 1702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used display information in a non-rectangular display area. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of bounding path techniques, the present technology can be configured to allow users to select to "opt in" or "opt out" of participation in the collection of personal information data during registration for services or anytime thereafter. In another example, users can select not to provide personal information to be displayed in non-rectangular areas. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the bounding path techniques, or publicly available information.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    identifying a collection of digital assets having at least a first digital asset and a second digital asset, the collection of digital assets being stored on a computing device;
    generating a consolidated address for a location cluster of digital assets comprising the first digital asset and the second digital asset;
    determining a first geographic location for the consolidated address based at least in part on location metadata associated with the first digital asset;
    determining a first time for the first digital asset based at least in part on time metadata associated with the first digital asset;
    transmitting a request to a web service for a plurality of event identifiers within a target range of the first geographic location, each of the event identifiers specifying an event geographic location and an event time;
    filtering the plurality of event identifiers, the filtering of the plurality of event identifiers to remove locations visited above a frequency threshold;
    accessing a knowledge graph stored on the computing device to correlate metadata for the collection of digital assets with a category identified in the knowledge graph;
    calculating a distance range between the first geographic location and a second geographic location, the second geographic location based at least in part on location metadata associated with the second digital asset, the second digital asset being within a target range of the event geographic location;
    calculating a time range between the first time and a second time, the second time based at least in part on time metadata associated with the second digital asset;
    calculating a confidence metric, the confidence metric indicating a degree of confidence that the first digital asset was generated at an event corresponding to at least one of the plurality of event identifiers, the confidence metric calculated based at least in part on rules for the category of the first digital asset, the rules specifying that the distance range satisfies a minimum distance, the time range satisfies a minimum duration, and a number of digital assets stored on the computing device that are within the distance range of the event geographic location and within the time range of an event time satisfies a minimum number;
    associating the first digital asset with at least one of the plurality of event identifiers based at least in part on a determination that the confidence metric exceeds a threshold; and
    updating the knowledge graph stored in the computing device to include the association between the first digital asset and the at least one of the plurality of event identifiers.

2. The method of claim 1, further comprising increasing the minimum distance to include additional digital assets captured within an expanded distance of the event geographic location.

3. The method of claim 1, further comprising expanding the event time to include additional digital assets captured prior to or after the event.

4. The method of claim 1, further comprising accessing the knowledge graph for a determination that scene metadata for the first digital asset identifies the category for the first digital asset based at least in part on image analysis of objects in the first digital asset.

5. The method of claim 1, further comprising:
    transmitting a request, to a second location service, the second location service tracking a history of geographic locations for the computing device over time, the request to the second location service requesting a length of time the computing device was located within a specified distance from the plurality of event identifiers within the target range of the first geographic location; and
    modifying the confidence metric based at least in part on the length of time the computing device spent within the specified distance from the plurality of event identifiers within the target range of the first geographic location.

6. The method of claim 1, further comprising:
    associating the second digital asset with the at least one of the plurality of event identifiers based on a determination that the confidence metric exceeds a threshold; and
    updating the knowledge graph stored in the computing device to include the association between the second digital asset and the at least one of the plurality of event identifiers.

7. The method of claim 1, further comprising linking the first digital asset associated with one of the plurality of event identifiers at least one of a name, a performer, and a venue for the event.

8. The method of claim 1, further comprising linking the first digital asset associated with one of the plurality of event identifiers with an event category for the event.

9. A computing device, comprising:
    one or more memories; and
    one or more processors in communication with the one or more memories and configured to execute instructions stored in the one or more memories to:
        identify a collection of digital assets having at least a first digital asset and a second digital asset, the collection of digital assets being stored on the computing device;
        generate a consolidated address for a location cluster of digital assets comprising the first digital asset and the second digital asset;
        determine a first geographic location for the consolidated address based at least in part on location metadata associated with the first digital asset;

determine a first time for the first digital asset based at least in part on time metadata associated with the first digital asset;

transmit a request to a web service for a plurality of event identifiers within a target range of the first geographic location, each of the event identifiers specifying an event geographic location and an event time;

access a knowledge graph to correlate metadata for the collection of digital assets with a category for the first digital asset identified in the knowledge graph;

calculate a distance range between the first geographic location a second geographic location, the second geographic location based at least in part on location metadata associated with the second digital asset, the second digital asset being within a target range of the event geographic location;

calculate a time range between the first time and a second time, the second time based at least in part on time metadata associated with the second digital asset;

calculate a confidence metric, the confidence metric indicating a degree of confidence that the first digital asset was generated at an event corresponding to at least one of the plurality of event identifiers, the confidence metric calculated based at least in part on rules for the category of the first digital asset, the rules specifying that the distance range satisfies a minimum distance, the time range satisfies a minimum duration, and a number of digital assets stored on the computing device satisfies a minimum number of digital assets that are within the distance range of the event geographic location and within the time range of an event time;

associate the first digital asset with at least one of the plurality of event identifiers based at least in part on a determination that the confidence metric exceeds a threshold; and update the knowledge graph stored in the computing device to include an association between the first digital asset and the at least one of the plurality of event identifiers.

10. The computing device of claim 9, wherein the one or more processors are further configured to execute the instructions to increase the minimum distance to include additional digital assets captured within an expanded distance of the event geographic location.

11. The computing device of claim 9, wherein the one or more processors are further configured to execute the instructions to expand the event time to include additional digital assets captured prior to or after the event.

12. The computing device of claim 9, wherein the one or more processors are further configured to execute the instructions to access the knowledge graph for a determination that scene metadata for the first digital asset identifies the category for the first digital asset based at least in part on image analysis of objects in the first digital asset.

13. The computing device of claim 9, wherein the one or more processors are further configured to execute the instructions to:

transmit a request, to a second location service, the second location service tracking a history of geographic locations for the computing device over time, the request to the second location service requesting a length of time the computing device was located within a specified distance from the plurality of event identifiers within the target range of the first geographic location; and modify the confidence metric based at least in part on the length of time the computing device spent within the specified distance from the plurality of event identifiers within the target range of the first geographic location.

14. The computing device of claim 9, wherein the one or more processors are further configured to execute the instructions to link the first digital asset associated with one of the plurality of event identifiers at least one of a name, a performer, and a venue for the event.

15. The computing device of claim 9, wherein the one or more processors are further configured to execute the instructions to link the first digital asset associated with one of the plurality of event identifiers with an event category for the event.

16. A computer-readable medium storing a plurality of instructions that, when executed by one or more processors of a computing device, cause the one or more processors of the computing device to perform operations comprising:

identifying a collection of digital assets having at least a first digital asset and a second digital asset, the collection of digital assets being stored on the computing device;

generating a consolidated address for a location cluster of digital assets comprising the first digital asset and the second digital asset;

determining a first geographic location for the consolidated address based at least in part on location metadata associated with the first digital asset;

determining a first time for the first digital asset based at least in part on time metadata associated with the first digital asset;

transmitting a request to a first web service for a plurality of event identifiers within a target range of the first geographic location, each of the event identifiers specifying an event geographic location and an event time;

accessing a knowledge graph stored on the computing device to correlate metadata for the collection of digital assets with a category identified in the knowledge graph;

calculating a distance range between the first geographic location and a second geographic location, the second geographic location based at least in part on location metadata associated with the second digital asset, the second digital asset being within the target range of the event geographic location;

calculating a time range between the first time and a second time, the second time based at least in part on time metadata associated with the second digital asset;

calculating a confidence metric, the confidence metric indicating a degree of confidence that the first digital asset was generated at an event corresponding to at least one of the plurality of event identifiers, the confidence metric calculated based at least in part on rules for the category of the first digital asset;

associating the first digital asset with at least one of the plurality of event identifiers based at least in part on a determination that the confidence metric exceeds a threshold; and updating the knowledge graph stored in the computing device to include the association between the first digital asset and at least one of the plurality of event identifiers.

17. The computer-readable medium of claim 16, further comprising increasing the target range to include additional digital assets captured within an expanded distance of the event geographic location.

18. The computer-readable medium of claim 16, further comprising expanding the event time to include additional digital assets captured prior to or after the event.

19. The computer-readable medium of claim 16, further comprising accessing the knowledge graph for a determination that scene metadata for the first digital asset identifies the category for the first digital asset based at least in part on image analysis of objects in the first digital asset.

20. The computer-readable medium of claim 16, further comprising
- transmitting a request, to a second location service, the second location service tracking a history of geographic locations for the computing device over time, the request to the second location service requesting a length of time the computing device was located within a specified distance from the plurality of event identifiers within the target range of the first geographic location; and
- modifying the confidence metric based at least in part on the length of time the computing device spent within the specified distance from the plurality of event identifiers within the target range of the first geographic location.

* * * * *